US012544564B2

United States Patent
Mazanec et al.

(10) Patent No.: US 12,544,564 B2
(45) Date of Patent: Feb. 10, 2026

(54) COCHLEAR IMPLANT SYSTEM WITH IMPROVED INPUT SIGNAL-TO-NOISE RATIO

(71) Applicant: Envoy Medical Corporation, White Bear Lake, MN (US)

(72) Inventors: Paul R. Mazanec, Ham Lake, MN (US); Brice Journot, Chisago City, MN (US); Ronald Wiese, Excelsior, MN (US)

(73) Assignee: Envoy Medical Corporation, White Bear Lake, MN (US)

( * ) Notice: Subject to any disclaimer, the term of this patent is extended or adjusted under 35 U.S.C. 154(b) by 585 days.

(21) Appl. No.: 17/685,806

(22) Filed: Mar. 3, 2022

(65) Prior Publication Data
US 2022/0280796 A1    Sep. 8, 2022

Related U.S. Application Data

(60) Provisional application No. 63/156,652, filed on Mar. 4, 2021.

(51) Int. Cl.
A61N 1/05        (2006.01)
A61N 1/02        (2006.01)
(Continued)

(52) U.S. Cl.
CPC ........... *A61N 1/0541* (2013.01); *A61N 1/025* (2013.01); *A61N 1/36038* (2017.08);
(Continued)

(58) Field of Classification Search
CPC .............. A61N 1/0541; A61N 1/36038; A61N 1/36171
See application file for complete search history.

(56) References Cited

U.S. PATENT DOCUMENTS 2,827,041 A    3/1958 Pierson
4,400,590 A    8/1983 Michelson
(Continued)

FOREIGN PATENT DOCUMENTS

AU    2011280051 A1 *    1/2013    ......... A61N 1/36034
CN       104394930 A      3/2015
(Continued)

OTHER PUBLICATIONS

International Patent Application No. PCT/US2022/018675, International Search Report and Written Opinion mailed Aug. 4, 2022, 19 pages.

(Continued)

Primary Examiner — Carl H Layno
Assistant Examiner — Maria Catherine Anthony
(74) Attorney, Agent, or Firm — Fredrikson & Byron, P.A.

(57) ABSTRACT

A cochlear implant system can comprise an input source configured to receive a stimulus and generate an input signal representative of the stimulus, a cochlear electrode, a stimulator in communication with the cochlear electrode configured to provide electrical stimulation to cochlear tissue via the cochlear electrode, and a signal processor programmed with a first pulse rate. The signal processor can be configured to receive the input signal from the input source and filter the input signal based on the first pulse rate such that one or more frequencies associated with the first pulse rate in the received input signal are attenuated. The signal processor can further be configured to output a stimulation signal to the stimulator based on the filtered input signal with the stimulation signal causing the stimulator to provide electrical stimulation to the cochlear tissue at the first pulse rate.

11 Claims, 16 Drawing Sheets

(51) Int. Cl.
*A61N 1/36* (2006.01)
*A61N 1/372* (2006.01)
(52) U.S. Cl.
CPC ..... *A61N 1/36171* (2013.01); *A61N 1/37223* (2013.01); *A61N 1/37235* (2013.01)

(56) References Cited

U.S. PATENT DOCUMENTS

| | | | |
|---|---|---|---|
| 4,495,384 A | 1/1985 | Scott et al. | |
| 4,729,366 A | 3/1988 | Schaefer | |
| 4,850,962 A | 7/1989 | Schaefer | |
| 4,918,745 A | 4/1990 | Hutchison | |
| 5,540,095 A | 7/1996 | Sherman et al. | |
| 5,755,742 A | 5/1998 | Schuelke et al. | |
| 5,762,583 A | 6/1998 | Adams et al. | |
| 6,151,400 A | 11/2000 | Seligman | |
| 6,195,585 B1* | 2/2001 | Karunasiri | A61N 1/37211 607/57 |
| 6,212,431 B1 | 4/2001 | Hahn et al. | |
| 6,259,951 B1 | 7/2001 | Kuzma et al. | |
| 6,272,382 B1 | 8/2001 | Faltys et al. | |
| 6,308,101 B1 | 10/2001 | Faltys et al. | |
| 6,358,281 B1 | 3/2002 | Berrang et al. | |
| 6,391,024 B1 | 5/2002 | Sun et al. | |
| 7,225,028 B2 | 5/2007 | Della Santina et al. | |
| 7,319,906 B2 | 1/2008 | Kuzma et al. | |
| 7,376,563 B2 | 5/2008 | Leysieffer et al. | |
| 7,524,278 B2 | 4/2009 | Madsen et al. | |
| 7,729,775 B1 | 6/2010 | Saoji et al. | |
| 8,553,901 B2 | 10/2013 | Hersbach | |
| 8,554,329 B1 | 10/2013 | Mann et al. | |
| 8,626,308 B2 | 1/2014 | Meskens | |
| 8,655,449 B2 | 2/2014 | Haller et al. | |
| 8,954,158 B2 | 2/2015 | Smith | |
| 9,020,172 B2 | 4/2015 | Hillbratt et al. | |
| 9,061,140 B2 | 6/2015 | Shi et al. | |
| 9,205,272 B2 | 12/2015 | Suaning et al. | |
| 9,339,648 B2* | 5/2016 | Smith | A61N 1/36038 |
| 9,451,368 B2 | 9/2016 | Mazanec | |
| 9,504,076 B2 | 11/2016 | El-Hoiydi et al. | |
| 9,539,430 B2 | 1/2017 | Mishra et al. | |
| 9,693,155 B2 | 6/2017 | Meister et al. | |
| 9,716,952 B2 | 7/2017 | Mauger | |
| 9,999,770 B2 | 6/2018 | Walraevens et al. | |
| 10,015,605 B2 | 7/2018 | Flynn et al. | |
| 10,201,704 B2 | 2/2019 | Meskens | |
| 10,751,524 B2 | 8/2020 | Ridler et al. | |
| 11,212,625 B2 | 12/2021 | Kerber | |
| 11,324,958 B2 | 5/2022 | Anderson et al. | |
| 11,330,378 B1 | 5/2022 | Jelcicova et al. | |
| 2002/0015506 A1 | 2/2002 | Aceti et al. | |
| 2002/0035309 A1 | 3/2002 | Leysieffer | |
| 2002/0039425 A1 | 4/2002 | Burnett et al. | |
| 2002/0099421 A1 | 7/2002 | Goldsmith et al. | |
| 2004/0230254 A1 | 11/2004 | Harrison et al. | |
| 2005/0033384 A1 | 2/2005 | Sacha | |
| 2005/0129262 A1 | 6/2005 | Dillon et al. | |
| 2005/0197677 A1 | 9/2005 | Stevenson | |
| 2006/0122664 A1 | 6/2006 | Sacha et al. | |
| 2006/0183965 A1 | 8/2006 | Kasic et al. | |
| 2008/0195179 A1 | 8/2008 | Quick | |
| 2008/0300658 A1 | 12/2008 | Meskens | |
| 2009/0018616 A1 | 1/2009 | Quick et al. | |
| 2009/0082831 A1 | 3/2009 | Paul et al. | |
| 2009/0171421 A1 | 7/2009 | Atalar et al. | |
| 2009/0187233 A1 | 7/2009 | Stracener | |
| 2009/0192565 A1 | 7/2009 | Lee et al. | |
| 2010/0010582 A1 | 1/2010 | Carbunaru et al. | |
| 2010/0030012 A1 | 2/2010 | Meskens | |
| 2010/0042183 A1 | 2/2010 | Beck | |
| 2010/0179615 A1 | 7/2010 | Zhang et al. | |
| 2010/0317913 A1 | 12/2010 | Conn et al. | |
| 2011/0066210 A1* | 3/2011 | Wilson | A61N 1/36038 607/57 |
| 2011/0082521 A1 | 4/2011 | Botros et al. | |
| 2011/0098785 A1 | 4/2011 | Mishra | |
| 2011/0116669 A1 | 5/2011 | Karunasiri | |
| 2011/0137180 A1 | 6/2011 | Johnson et al. | |
| 2011/0144719 A1 | 6/2011 | Perkins et al. | |
| 2011/0160808 A1 | 6/2011 | Lyden et al. | |
| 2011/0280426 A1 | 11/2011 | Bachler | |
| 2011/0295331 A1 | 12/2011 | Wells et al. | |
| 2012/0063610 A1 | 3/2012 | Kaulberg et al. | |
| 2012/0215285 A1 | 8/2012 | Tahmasian et al. | |
| 2012/0277835 A1 | 11/2012 | Della Santina et al. | |
| 2013/0018216 A1 | 1/2013 | Beckerle et al. | |
| 2013/0023953 A1 | 1/2013 | Van Den Honert | |
| 2013/0193914 A1 | 8/2013 | Gaddam et al. | |
| 2013/0197613 A1 | 8/2013 | Kelly et al. | |
| 2013/0223664 A1 | 8/2013 | Meskens et al. | |
| 2013/0238055 A1 | 9/2013 | Marnfeldt et al. | |
| 2013/0268025 A1 | 10/2013 | Ranu | |
| 2013/0278226 A1 | 10/2013 | Cong et al. | |
| 2013/0317584 A1 | 11/2013 | Stevenson et al. | |
| 2014/0058482 A1 | 2/2014 | Gupta et al. | |
| 2014/0070761 A1 | 3/2014 | Labbe et al. | |
| 2014/0155947 A1 | 6/2014 | Kroll et al. | |
| 2014/0247954 A1 | 9/2014 | Hall et al. | |
| 2014/0270211 A1 | 9/2014 | Solum et al. | |
| 2014/0275730 A1 | 9/2014 | Lievens et al. | |
| 2014/0309712 A1 | 10/2014 | Masaki et al. | |
| 2014/0350652 A1 | 11/2014 | Suwito | |
| 2015/0125012 A1 | 5/2015 | Sabin | |
| 2015/0174416 A1 | 6/2015 | Angara et al. | |
| 2015/0224312 A1 | 8/2015 | Platz et al. | |
| 2015/0256945 A1 | 9/2015 | Mazanec | |
| 2015/0374988 A1 | 12/2015 | Laudanski | |
| 2015/0375003 A1 | 12/2015 | Meskens | |
| 2016/0050500 A1 | 2/2016 | Liao et al. | |
| 2016/0227333 A1 | 8/2016 | Babico | |
| 2017/0043162 A1 | 2/2017 | Lopez-Poveda | |
| 2017/0077938 A1 | 3/2017 | Heubi | |
| 2017/0094396 A1 | 3/2017 | Chandramohan et al. | |
| 2017/0161449 A1 | 6/2017 | Meskens | |
| 2017/0259072 A1 | 9/2017 | Newham et al. | |
| 2017/0360364 A1 | 12/2017 | Heasman et al. | |
| 2018/0028811 A1 | 2/2018 | Van Gerwen et al. | |
| 2018/0028827 A1 | 2/2018 | Schilling et al. | |
| 2018/0041848 A1 | 2/2018 | Nielsen et al. | |
| 2018/0050197 A1 | 2/2018 | Mazanec et al. | |
| 2018/0050198 A1 | 2/2018 | Mazanec et al. | |
| 2018/0050203 A1 | 2/2018 | Mazanec et al. | |
| 2018/0059870 A1 | 3/2018 | Krah | |
| 2018/0264269 A1 | 9/2018 | Meadows | |
| 2018/0317027 A1 | 11/2018 | Bolner et al. | |
| 2018/0333577 A1 | 11/2018 | Nygard et al. | |
| 2018/0361151 A1 | 12/2018 | Ridler et al. | |
| 2019/0045308 A1 | 2/2019 | Chen et al. | |
| 2019/0046116 A1 | 2/2019 | Shah et al. | |
| 2019/0190296 A1 | 6/2019 | Paralikar et al. | |
| 2019/0217101 A1 | 7/2019 | Shi et al. | |
| 2019/0231203 A1 | 8/2019 | Harczos | |
| 2019/0344073 A1 | 11/2019 | Baker et al. | |
| 2019/0358450 A1 | 11/2019 | Lo et al. | |
| 2020/0054877 A1 | 2/2020 | Calixto et al. | |
| 2020/0238075 A1 | 7/2020 | Mazanec et al. | |
| 2020/0269034 A1 | 8/2020 | Mazanec et al. | |
| 2020/0269035 A1 | 8/2020 | Mazanec et al. | |
| 2020/0269047 A1 | 8/2020 | Mazanec et al. | |
| 2020/0269048 A1 | 8/2020 | Mazanec et al. | |
| 2020/0269057 A1 | 8/2020 | Mazanec et al. | |
| 2020/0269058 A1 | 8/2020 | Mazanec et al. | |
| 2021/0084417 A1 | 3/2021 | Bagazov et al. | |
| 2021/0121707 A1 | 4/2021 | Fried et al. | |
| 2021/0135704 A1 | 5/2021 | El-Hoiydi et al. | |
| 2021/0187293 A1 | 6/2021 | Friedling | |
| 2021/0361194 A1 | 11/2021 | Arab et al. | |
| 2022/0203104 A1 | 6/2022 | Hernandez et al. | |
| 2022/0339445 A1 | 10/2022 | Litvak et al. | |

FOREIGN PATENT DOCUMENTS

| | | |
|---|---|---|
| CN | 110086237 A | 8/2019 |
| DE | 4419070 A1 | 12/1994 |

(56) References Cited

FOREIGN PATENT DOCUMENTS

| | | |
|---|---|---|
| DE | 60107062 T2 | 12/2004 |
| DE | 102013214049 B4 | 3/2015 |
| EP | 1043914 A2 | 10/2000 |
| EP | 1683544 B1 | 11/2010 |
| EP | 2884766 B1 | 2/2018 |
| EP | 3120579 B1 | 2/2020 |
| JP | 2016024111 A | 2/2016 |
| TW | 201142830 A | 12/2011 |
| WO | 2007137032 A2 | 11/2007 |
| WO | 2010056768 A1 | 5/2010 |
| WO | 2014037888 A1 | 3/2014 |
| WO | 2014054215 A1 | 4/2014 |
| WO | 2015077773 A1 | 5/2015 |
| WO | 2016122606 A1 | 8/2016 |
| WO | 2017100866 A1 | 6/2017 |
| WO | 2018035329 A1 | 2/2018 |
| WO | 2018144732 A1 | 8/2018 |
| WO | 2020172500 A1 | 8/2020 |

OTHER PUBLICATIONS

Yip et al. "A Fully-Implantable Cochlear Implant SoC With Piezoelectric Middle-Ear Sensor and Arbitrary Waveform Neural Stimulation" IEEE J Solid-State Circuits, Author Manuscript; Available in PMC Jan. 1, 2016, pp. 36.

International Patent Application No. PCT/US2022/018675, Invitation to Pay Additional Fees and Partial Search Report mailed Jun. 14, 2022, 11 pages.

Mazanec et al., unpublished U.S. Appl. No. 17/182,469, entitled Combination Implant System With Removable Earplug Sensor and Implanted Battery, filed Feb. 23, 2021, 32 pages.

\* cited by examiner

COCHLEAR IMPLANT SYSTEM WITH IMPROVED INPUT SIGNAL-TO-NOISE RATIO

RELATED APPLICATIONS

This application claims the benefit of U.S. Provisional Patent Application No. 63/156,652, filed Mar. 4, 2021, the contents of which are incorporated herein by reference.

BACKGROUND

A cochlear implant is an electronic device that may be at least partially implanted surgically into the cochlea, the hearing organ of the inner ear, to provide improved hearing to a patient. Cochlear implants may include components that are worn externally by the patient and components that are implanted internally in the patient.

Cochlear implant systems can provide improved hearing to a patient by receiving external stimuli and generating stimulation signals, such as electrical signals, based on the received external stimuli. However, noise present at any stage of the implant system can negatively impact the operation of the system, for example, be reducing the accuracy of the representation of the external stimuli by the stimulation signals.

SUMMARY

In some cochlear implant systems, electrical stimulation pulses can be delivered to the cochlear nerve at a variety of frequencies and can be controlled to have a specific frequency. One potential source of noise includes noise from the stimulation output by the cochlear implant system picked up by the input side of the cochlear implant system (e.g., by a sensor or by wiring connecting the sensor to other system components). Filtering such noise can be difficult without also filtering the desired electrical signals.

Aspects of this disclosure are directed toward a cochlear implant system, and some aspects of the disclosure are directed toward improving the input signal-to-noise ratio through filtering out noise produced by delivering stimulation pules at specific frequencies.

In one aspect of the present disclosure, a cochlear implant system includes an input source configured to receive a stimulus and generate an input signal representative of the stimulus. The cochlear implant system also includes a cochlear electrode and a stimulator in communication with the cochlear electrode that is configured to provide electrical stimulation to cochlear tissue via the cochlear electrode. The cochlear implant system further includes a signal processor in communication with the stimulator and the input source with the signal processor being programmed with a first pulse rate and being configured to receive the input signal from the input source. The signal processor is also configured to filter the received input signal based on the first pulse rate such that one or more frequencies associated with the first pulse rate in the received input signal are attenuated. The signal processor is additionally configured to output a stimulation signal to the stimulator based on the filtered input signal with the stimulation signal causing the stimulator to provide electrical stimulation to the cochlear tissue at the first pulse rate.

In another aspect of the present disclosure, a cochlear implant system includes an input source configured to receive an acoustic stimulus and generate an input signal representative of the received acoustic stimulus. The cochlear implant system also includes a stimulator configured to provide electrical stimulation to cochlear tissue to stimulate the cochlear tissue at a first pulse rate and a signal processor in communication with the stimulator and the input source. The signal processor is configured to provide a stimulation signal to the stimulator causing the stimulator to provide electrical stimulation at the first pulse rate and receive an input signal from the input source while the stimulator is providing electrical stimulation at the first pulse rate. The signal processor is also configured to transform the input signal to generate a transformed input signal representative of the frequency content of the received input signal. The signal processor is further configured to compare an amplitude of at least a portion of the transformed input signal to a threshold with the portion of the transformed input signal including a frequency associated with the first pulse rate. If the amplitude of the portion of the transformed input signal exceeds the threshold the signal processor is configured to filter the input signal by attenuating frequencies in the input signal corresponding to the portion of frequencies in the transformed input signal that exceed the threshold. Additionally, if the amplitude of the portion of the transformed input signal exceeds the threshold the signal processor is configured to generate a filtered stimulation signal based on the filtered input signal and provide the filtered stimulation signal to the stimulator to cause the stimulator to provide electrical stimulation to the cochlear tissue at the first pulse rate based on the filtered input signal.

In another aspect of the present disclosure, a cochlear implant system includes an input source configured to receive a stimulus and generate input signals representative of the stimulus as well as a stimulator configured to provide electrical stimulation to cochlear tissue at a first pulse rate. The cochlear implant system also includes a signal processor in communication with the stimulator and the input source which is configured to receive an input signal from the input source and determine if interference from electrical stimulation provided by the stimulator is present in the input signal. If interference is determined to be present in the input signal, the signal processor is configured to generate a filtered input signal by applying a filter to the input signal and provide a stimulation signal to the stimulator to cause the stimulator to provide electrical stimulation to the cochlear tissue at the first pulse rate based on the filtered input signal.

DETAILED DESCRIPTION

Figure 1:
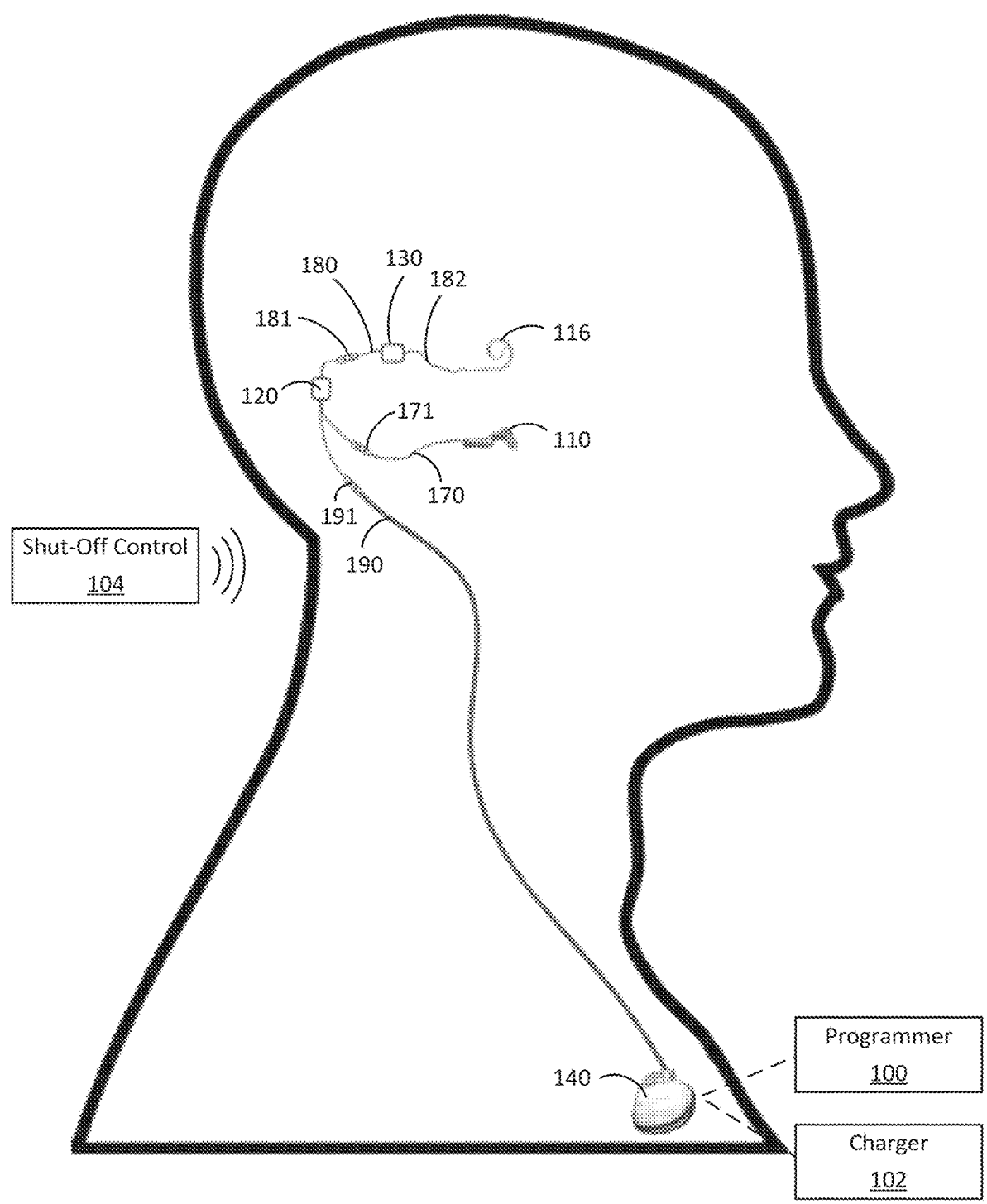
FIG. 1 shows a schematic illustration of a fully implantable cochlear implant system.

FIG. 1 shows a schematic illustration of a fully implantable cochlear implant system. The system of FIG. 1 includes a middle ear sensor 110 in communication with a signal processor 120. The middle ear sensor 110 can be configured to detect incoming sound waves, for example, using the ear structure of a patient. The signal processor 120 can be configured to receive a signal from the middle ear sensor 110 and produce an output signal based thereon. For example, the signal processor 120 can be programmed with instructions to output a certain signal based on a received signal. In some embodiments, the output of the signal processor 120 can be calculated using an equation based on received input signals. Alternatively, in some embodiments, the output of the signal processor 120 can be based on a lookup table or other programmed (e.g., in memory) correspondence between the input signal from the middle ear sensor 110 and the output signal. While not necessarily based explicitly on a function, the relationship between the input to the signal processor 120 (e.g., from the middle ear sensor 110) and the output of the signal processor 120 is referred to as the transfer function of the signal processor 120.

In various examples, the signal processor 120 can comprise any variety of components, for example, digital and/or analog processing components. In some embodiments, signal processor 120 comprises a digital signal processor, one or more microprocessors, microcontrollers, application specific integrated circuits (ASICs) or the like. Supporting circuitry for one or more such components can also be included as a part of the signal processor. In some embodiments, the signal processor can include or otherwise communicate with a memory containing programming for operating one or more components. Additionally or alternatively, in some embodiments, the signal processor can include one or more additional components. For example, in some embodiments, signal processor can include an embedded microphone or other sensor configured to detect incoming sound waves.

The system of FIG. 1 further includes a cochlear electrode 116 implanted into the cochlear tissues of a patient. The cochlear electrode 116 is in electrical communication with an electrical stimulator 130, which can be configured to provide electrical signals to the cochlear electrode 116 in response to input signals received by the electrical stimulator 130. In some examples, the cochlear electrode 116 is fixedly attached to the electrical stimulator 130. In other examples, the cochlear electrode 116 is removably attached to the electrical stimulator 130. As shown, the electrical stimulator 130 is in communication with the signal processor 120. In some embodiments, the electrical stimulator 130 provides electrical signals to the cochlear electrode 116 based on output signals from the signal processor 120.

In various embodiments, the cochlear electrode 116 can include any number of contact electrodes in electrical contact with different parts of the cochlear tissue. In such embodiments, the electrical stimulator 130 can be configured to provide electrical signals to any number of such contact electrodes to stimulate the cochlear tissue. For example, in some embodiments, the electrical stimulator 130 is configured to activate different contact electrodes or combinations of contact electrodes of the cochlear electrode 116 in response to different input signals received from the signal processor 120. This can help the patient differentiate between different input signals.

During exemplary operation, the middle ear sensor 110 detects audio signals, for example, using features of the patient's ear anatomy as described elsewhere herein and in U.S. Patent Publication No. 2013/0018216, which is hereby incorporated by reference in its entirety. The signal processor 120 can receive such signals from the middle ear sensor 110 and produce an output to the electrical stimulator 130 based on the transfer function of the signal processor 120. The electrical stimulator 130 can then stimulate one or more contact electrodes of the cochlear electrode 116 based on the received signals from the signal processor 120.

Figure 2:
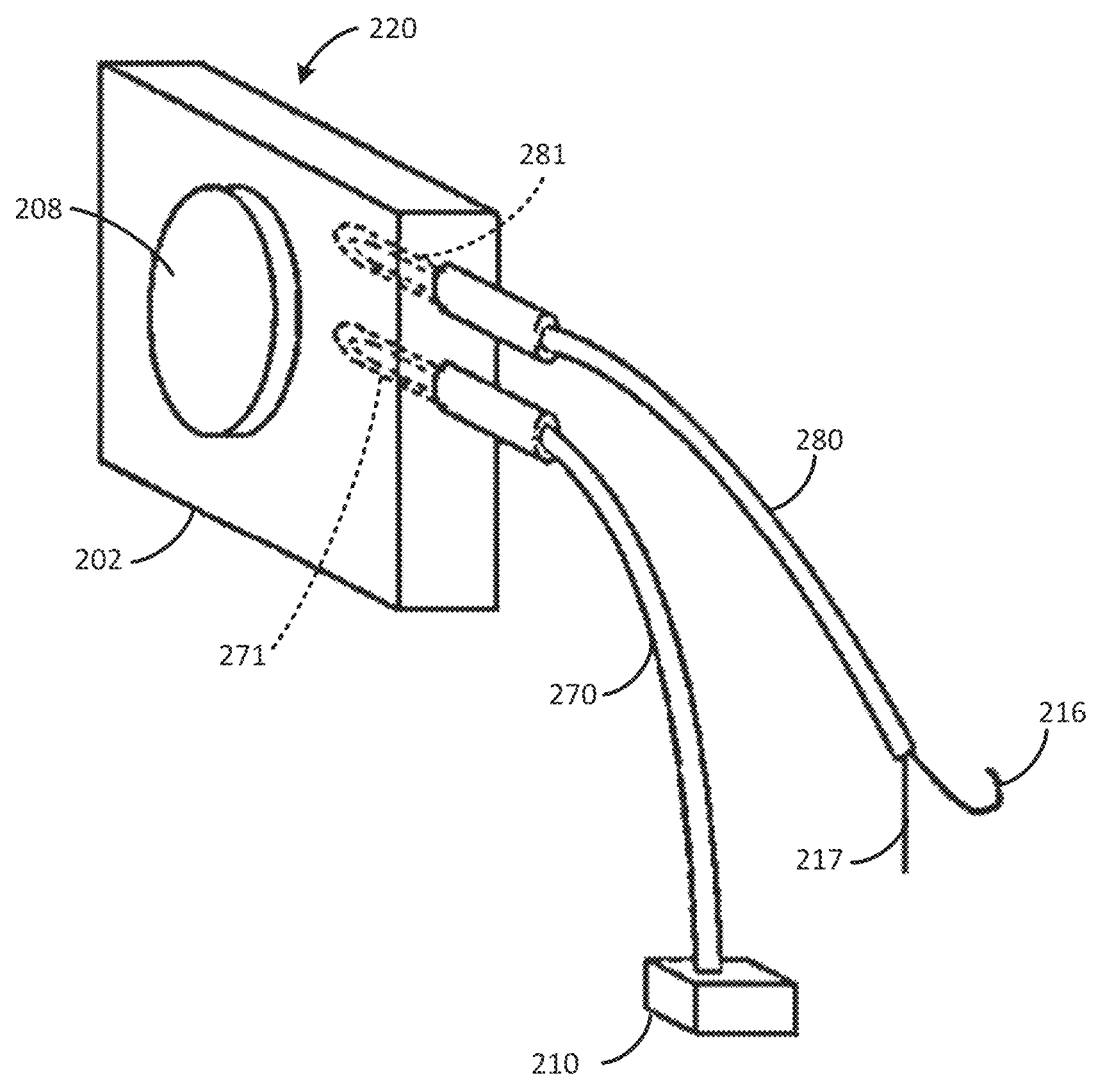
FIG. 2 shows an embodiment of a fully implantable cochlear implant.

Referring to FIG. 2, an embodiment of a fully-implantable cochlear implant is shown. The device in this embodiment includes a processor 220 (e.g., signal processor), a sensor 210, a first lead 270 connecting the sensor 210 to the processor 220, and a combination lead 280 attached to the processor 220, wherein combination lead 280 contains both a ground electrode 217 and a cochlear electrode 216. The illustrated processor 220 includes a housing 202, a coil 208, first female receptacle 271 and second female receptacle 281 for insertion of the leads 270 and 280, respectively.

In some embodiments, coil 208 can receive power and/or data from an external device, for instance, including a transmission coil (not shown). Some such examples are described in U.S. Patent Publication No. 2013/0018216, which is incorporated by reference. In other examples, processor 220 is configured to receive power and/or data from other sources, such as an implantable battery and/or communication module as shown in FIG. 1. Such battery and/or communication module can be implanted, for example, into the pectoral region of the patient in order to provide adequate room for larger equipment (e.g., a relatively large battery) for prolonged operation (e.g., longer battery life). Additionally, in the event a battery needs eventual replacement, a replacement procedure in the patient's pectoral region can be performed several times without certain vascularization issues that can arise near the location of the cochlear implant. For example, in some cases, repeated procedures (e.g., battery replacement) near the cochlear implant can result in a decreased ability for the skin in the region to heal after a procedure. Placing a replaceable component such as a battery in the pectoral region can facilitate replacement procedures with reduced risk for such issues.

Figure 3:
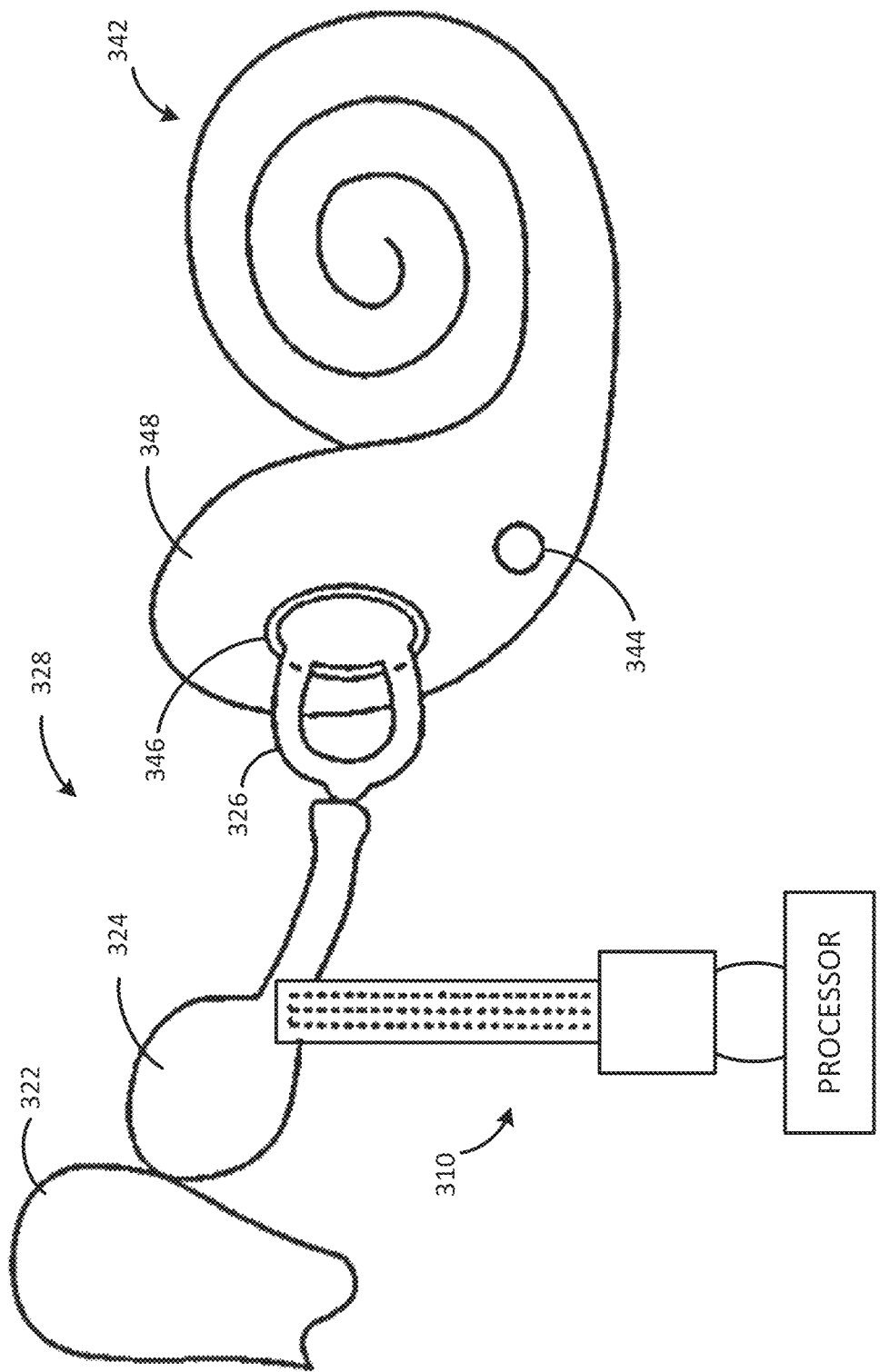
FIG. 3 illustrates an embodiments of an exemplary middle ear sensor for use in conjunction with anatomical features of a patient.

FIG. 3 illustrates embodiments of an exemplary middle ear sensor for use in conjunction with anatomical features of a patient. Referring to FIG. 3, an embodiment of the sensor 310 of a fully-implantable cochlear implant is shown. Also shown are portions of the subject's anatomy, which includes, if the subject is anatomically normal, at least the malleus 322, incus 324, and stapes 326 of the middle ear 328, and the cochlea 348, oval window 346, and round window 344 of the inner ear 342. Here, the sensor 310 is touching the incus 324. The sensor 310 can include a sensor such as described in U.S. Patent Publication No. 2013/0018216, which is incorporated by reference. Further, although not shown in a drawing, the sensor 310 may be in operative contact with the tympanic membrane or the stapes, or any combination of the tympanic membrane, malleus 322, incus 324, or stapes 326.

FIG. 3 illustrates an exemplary middle ear sensor for use with systems described herein. However, other middle ear sensors can be used, such as sensors using microphones or other sensors capable of receiving an input corresponding to detected sound and outputting a corresponding signal to the signal processor. Additionally or alternatively, systems can include other sensors configured to output a signal representative of sound received at or near a user's ear, such as a microphone or other acoustic pickup located in the user's outer ear or implanted under the user's skin. Such devices may function as an input source, for example, to the signal processor such that the signal processor receives an input signal from the input source and generates and outputs one or more stimulation signals according to the received input signal and the signal processor transfer function. Additionally or alternatively, systems can include other types of sensors, such as inner ear sensors. Some example configurations of such systems and other sensor arrangements are described in PCT patent application No. PCT/US20/19166, filed Feb. 21, 2020, which is assigned to the assignee of the instant application and is incorporated by reference.

Referring back to FIG. 1, the signal processor 120 is shown as being in communication with the middle ear sensor 110, the electrical stimulator 130, and the implantable battery and/or communication module 140. As described elsewhere herein, the signal processor 120 can receive input signals from the middle ear sensor 110 and/or other input source(s) and output signals to the electrical stimulator 130 for stimulating the cochlear electrode 116. The signal processor 120 can receive data (e.g., processing data establishing or updating the transfer function of the signal processor 120) and/or power from the implantable battery and/or communication module 140.

In some embodiments, the implantable battery and/or communication module 140 can communicate with one or more external components, such as a programmer 100 and/or a battery charger 102. The battery charger 102 can wirelessly charge the battery in the implantable battery and/or communication module 140 when brought into proximity with the implantable battery and/or communication module 140 in the pectoral region of the patient. Such charging can be accomplished, for example, using inductive charging. The programmer 100 can be configured to wirelessly communicate with the implantable battery and/or communication module 140 via any appropriate wireless communication technology, such as Bluetooth, Wi-Fi, and the like. In some examples, the programmer 100 can be used to update the system firmware and/or software. In an exemplary operation, the programmer 100 can be used to communicate an updated signal processor 120 transfer function to the implantable battery and/or communication module 140. In various embodiments, the programmer 100 and battery charger 102 can be separate devices or can be integrated into a single device.

In the illustrated example of FIG. 1, the signal processor 120 is connected to the middle ear sensor 110 via lead 170. In some embodiments, lead 170 can provide communication between the signal processor 120 and the middle ear sensor 110. In some embodiments, lead 170 can include a plurality of isolated conductors providing a plurality of communication channels between the middle ear sensor 110 and the signal processor 120. The lead 170 can include a coating such as an electrically insulating sheath to minimize any conduction of electrical signals to the body of the patient. In various embodiments, one or more communication leads can be detachable such that communication between two components can be disconnected in order to electrically and/or mechanically separate such components. For instance, in some embodiments, lead 170 includes a detachable connector 171. Detachable connector 171 can facilitate decoupling of the signal processor 120 and middle ear sensor 110. Example detachable connectors are described in PCT patent application No. PCT/US20/19166, which is incorporated by reference. For example, with reference to FIG. 1, in some embodiments, lead 170 can include a first lead extending from the middle ear sensor 110 having one of a male or a female connector and a second lead extending from the signal processor 120 having the other of the male or female connector. The first and second leads can be connected at detachable connector 171 in order to facilitate communication between the middle ear sensor 110 and the signal processor 120.

In other examples, a part of the detachable connector 171 can be integrated into one of the middle ear sensor 110 and the signal processor 120. For example, in an exemplary embodiment, the signal processor 120 can include a female connector integrated into a housing of the signal processor 120. Lead 170 can extend fully from the middle ear sensor 110 and terminate at a corresponding male connector for inserting into the female connector of the signal processor 120. In still further embodiments, a lead (e.g., 170) can include connectors on each end configured to detachably connect with connectors integrated into each of the components in communication. For example, lead 170 can include two male connectors, two female connectors, or one male and one female connector for detachably connecting with corresponding connectors integral to the middle ear sensor 110 and the signal processor 120. Thus, lead 170 may include two or more detachable connectors.

Similar communication configurations can be established for detachable connector 181 of lead 180 facilitating communication between the signal processor 120 and the stimulator 130 and for detachable connector 191 of lead 190 facilitating communication between the signal processor 120 and the implantable battery and/or communication module 140. Leads (170, 180, 190) can include pairs of leads having corresponding connectors extending from each piece of communicating equipment, or connectors can be built in to any one or more communicating components.

In such configurations, each of the electrical stimulator 130, signal processor 120, middle ear sensor 110, and battery and/or communication module can each be enclosed in a housing, such as a hermetically sealed housing comprising biocompatible materials. Such components can include feedthroughs providing communication to internal components enclosed in the housing. Feedthroughs can provide electrical communication to the component via leads extending from the housing and/or connectors integrated into the components.

In a module configuration such as that shown in FIG. 1, various components can be accessed (e.g., for upgrades, repair, replacement, etc.) individually from other components. For example, as signal processor 120 technology improves (e.g., improvements in size, processing speed, power consumption, etc.), the signal processor 120 implanted as part of the system can be removed and replaced independently of other components. In an exemplary procedure, an implanted signal processor 120 can be disconnected from the electrical stimulator 130 by disconnecting detachable connector 181, from the middle ear sensor 110 by disconnecting detachable connector 171, and from the implantable battery and/or communication module 140 by disconnecting detachable connector 191. Thus, the signal processor 120 can be removed from the patient while other components such as the electrical stimulator 130, cochlear electrode 116, middle ear sensor 110, and battery and/or communication module can remain in place in the patient.

After the old signal processor is removed, a new signal processor can be connected to the electrical stimulator 130, middle ear sensor 110, and implantable battery and/or communication module 140 via detachable connectors 181, 171, and 191, respectively. Thus, the signal processor (e.g., 120) can be replaced, repaired, upgraded, or any combination thereof, without affecting the other system components. This can reduce, among other things, the risk, complexity, duration, and recovery time of such a procedure. In particular, the cochlear electrode 116 can be left in place in the patient's cochlea while other system components can be adjusted, reducing trauma to the patient's cochlear tissue.

Such modularity of system components can be particularly advantageous when replacing a signal processor 120, such as described above. Processor technology continues to improve and will likely continue to markedly improve in the future, making the signal processor 120 a likely candidate for significant upgrades and/or replacement during the patient's lifetime. Additionally, in embodiments such as the embodiment shown in FIG. 1, the signal processor 120 communicates with many system components. For example, as shown, the signal processor 120 is in communication with each of the electrical stimulator 130, the middle ear sensor 110, and the implantable battery and/or communication module 140. Detachably connecting such components with the signal processor 120 (e.g., via detachable connectors 181, 171, and 191) enables replacement of the signal processor 120 without disturbing any other components. Thus, in the event of an available signal processor 120 upgrade and/or a failure of the signal processor 120, the signal processor 120 can be disconnected from other system components and removed.

While many advantages exist for a replaceable signal processor 120, the modularity of other system components can be similarly advantageous, for example, for upgrading any system component. Similarly, if a system component (e.g., the middle ear sensor 110) should fail, the component can be disconnected from the rest of the system (e.g., via detachable connector 171) and replaced without disturbing the remaining system components. In another example, even a rechargeable battery included in the implantable battery and/or communication module 140 may eventually wear out and need replacement. The implantable battery and/or communication module 140 can be replaced or accessed (e.g., for replacing the battery) without disturbing other system components. Further, as discussed elsewhere herein, when the implantable battery and/or communication module 140 is implanted in the pectoral region of the patient, such as in the illustrated example, such a procedure can leave the patient's head untouched, eliminating unnecessarily frequent access beneath the skin.

While various components are described herein as being detachable, in various embodiments, one or more components configured to communicate with one another can be integrated into a single housing. For example, in some embodiments, signal processor 120 can be integrally formed with the stimulator 130 and cochlear electrode 116. For example, in an exemplary embodiment, processing and stimulation circuitry of a signal processor 120 and stimulator 130 can be integrally formed as a single unit in a housing coupled to a cochlear electrode. Cochlear electrode and the signal processor/stimulator can be implanted during an initial procedure and operate as a single unit.

In some embodiments, while the integral signal processor/stimulator/cochlear electrode component does not get removed from a patient due to potential damage to the cochlear tissue into which the cochlear electrode is implanted, system upgrades are still possible. For example, in some embodiments, a modular signal processor may be implanted alongside the integral signal processor/stimulator component and communicate therewith. In some such examples, the integral signal processor may include a built-in bypass to allow a later-implanted signal processor to interface directly with the stimulator. Additionally or alternatively, the modular signal processor can communicate with the integral signal processor, which may be programmed with a unity transfer function. Thus, in some such embodiments, signals from the modular signal processor may be essentially passed through the integral signal processor unchanged so that the modular signal processor effectively controls action of the integral stimulator. Thus, in various embodiments, hardware and/or software solutions exist for upgrading an integrally attached signal processor that may be difficult or dangerous to remove.

While often described herein as using an electrical stimulator to stimulate the patient's cochlear tissue via a cochlear electrode, in some examples, the system can additionally or alternatively include an acoustic stimulator. An acoustic stimulator can include, for example, a transducer (e.g., a piezoelectric transducer) configured to provide mechanical stimulation to the patient's ear structure. In an exemplary embodiment, the acoustic stimulator can be configured to stimulate one or more portions of the patient's ossicular chain via amplified vibrations. Acoustic stimulators can include any appropriate acoustic stimulators, such as those found in the ESTEEM™ implant (Envoy Medical Corp., St. Paul, Minn.) or as described in U.S. Pat. Nos. 4,729,366, 4,850,962, and 7,524,278, and U.S. Patent Publication No. 20100042183, each of which is incorporated herein by reference in its entirety.

Figure 4:
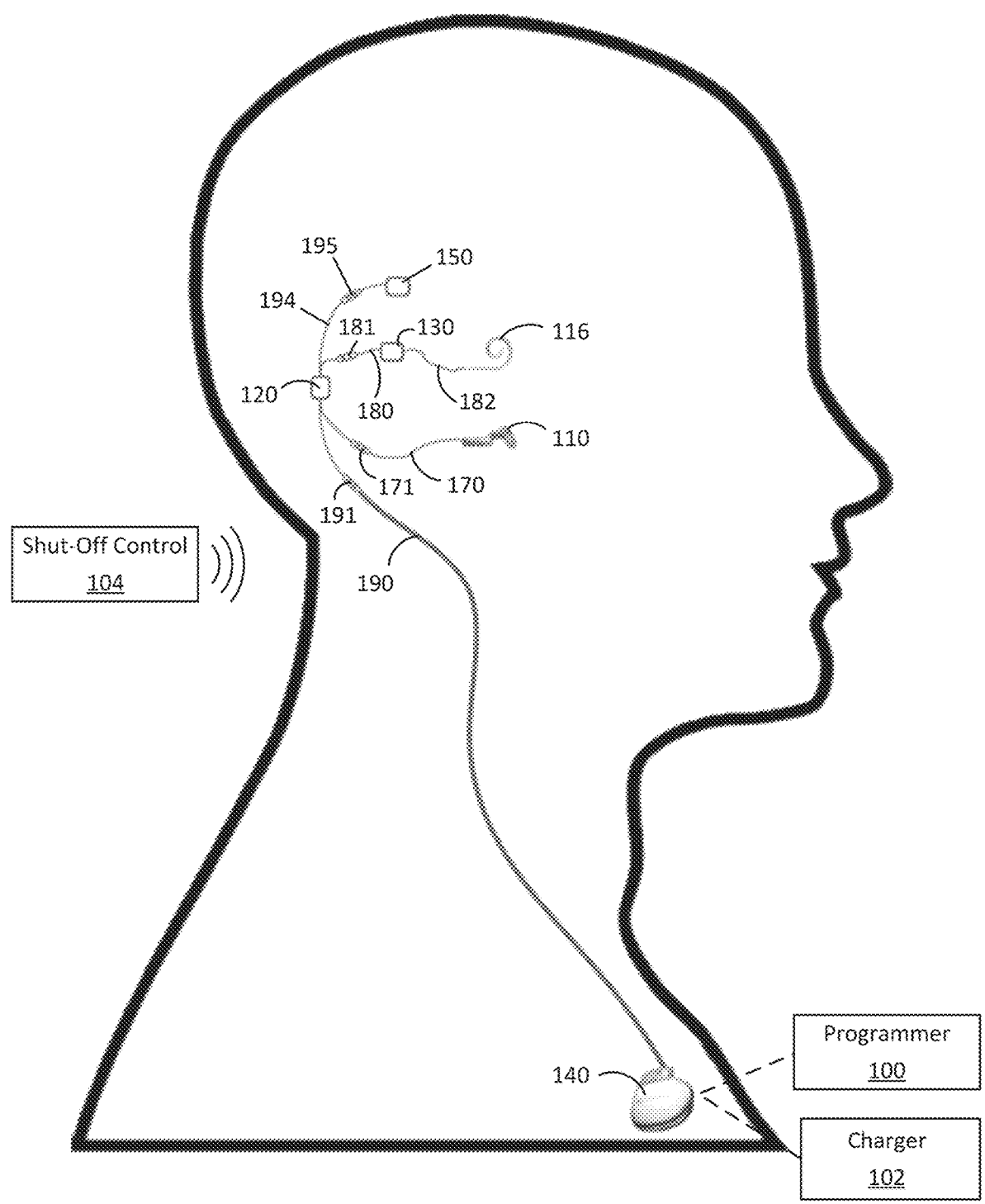
FIG. 4 is a schematic diagram illustrating an exemplary implantable system including an acoustic stimulator.

FIG. 4 is a schematic diagram illustrating an exemplary implantable system including an acoustic stimulator. The acoustic stimulator can be implanted proximate the patient's ossicular chain and can be in communication with a signal processor via lead 194 and detachable connector 195. The signal processor can behave as described elsewhere herein and can be configured to cause acoustic stimulation of the ossicular chain via the acoustic stimulator in in response to input signals from the middle ear sensor according to a transfer function of the signal processor.

The acoustic stimulator of FIG. 4 can be used similarly to the electrical stimulator as described elsewhere herein. For instance, an acoustic stimulator can be mechanically coupled to a patient's ossicular chain upon implanting the system and coupled to the signal processor via lead 194 and detachable connector 195. Similarly to systems described elsewhere herein with respect to the electrical stimulator, if the signal processor requires replacement or repair, the signal processor can be disconnected from the acoustic stimulator (via detachable connector 195) so that the signal processor can be removed without disturbing the acoustic stimulator.

In general, systems incorporating an acoustic stimulator such as shown in FIG. 4 can operate in the same way as systems described elsewhere herein employing an electrical stimulator and cochlear electrode only substituting electrical stimulation for acoustic stimulation.

Some systems can include a hybrid system comprising both an electrical stimulator and an acoustic stimulator in communication with the signal processor. In some such examples, the signal processor can be configured to stimulate electrically and/or acoustically according to the transfer function of the signal processor. In some examples, the type of stimulation used can depend on the input signal received by the signal processor. For instance, in an exemplary embodiment, the frequency content of the input signal to the signal processor can dictate the type of stimulation. In some cases, frequencies below a threshold frequency could be represented using one of electrical and acoustic stimulation while frequencies above the threshold frequency could be represented using the other of electrical and acoustic stimulation. Such a threshold frequency could be adjustable based on the hearing profile of the patient. Using a limited range of frequencies can reduce the number of frequency domains, and thus the number of contact electrodes, on the cochlear electrode. In other examples, rather than a single threshold frequency defining which frequencies are stimulated electrically and acoustically, various frequencies can be stimulated both electrically and acoustically. In some such examples, the relative amount of electrical and acoustic stimulation can be frequency-dependent. As described elsewhere herein, the signal processor transfer function can be updated to meet the needs of the patient, including the electrical and acoustic stimulation profiles.

Additionally or alternatively, while many examples show a middle ear sensor being in communication with an implanted signal processor, in various embodiments, one or more additional or alternative input sources can be included. For instance, in some embodiments, a microphone can be implanted under a user's skin and can be placed in communication with the signal processor (e.g., via a detachable connector such as 171). The signal processor can receive input signals from the implanted microphone and provide signals to the stimulator based on the received input signal and the signal processor transfer function. Additionally or alternatively, systems can include a middle ear sensor as an input source, wherein the middle ear sensor is configured to detect stimuli (e.g., pressure signals) from the wearer's inner ear (e.g., within the cochlear tissue).

With further reference to FIGS. 1 and 4, in some examples, a system can include a shut-off controller 104, which can be configured to wirelessly stop an electrical stimulator 130 from stimulating the patient's cochlear tissue and/or an acoustic stimulator 150 from stimulating the patient's ossicular chain. For example, if the system is malfunctioning or an uncomfortably loud input sound causes an undesirable level of stimulation, the user may use the shut-off controller 104 to cease stimulation from the stimulator 130. The shut-off controller 104 can be embodied in a variety of ways. For example, in some embodiments, the shut-off controller 104 can be integrated into other external components, such as the programmer 100. In some such examples, the programmer 100 includes a user interface by which a user can select an emergency shut-off feature to cease stimulation. Additionally or alternatively, the shut-off controller 104 can be embodied as a separate component. This can be useful in situations in which the patient may not have immediate access to the programmer 100. For example, the shut-off controller 104 can be implemented as a wearable component that the patient can wear at all or most times, such as a ring, bracelet, necklace, or the like.

The shut-off controller 104 can communicate with the system in order to stop stimulation in a variety of ways. In some examples, the shut-off controller 104 comprises a magnet that is detectable by a sensor (e.g., a Hall-Effect sensor) implanted in the patient, such as in the processor and/or the implantable battery and/or communication module 140. In some such embodiments, when the magnet is brought sufficiently close to the sensor, the system can stop stimulation of the cochlear tissue or ossicular chain.

After the shut-off controller 104 is used to disable stimulation, stimulation can be re-enabled in one or more of a variety of ways. For example, in some embodiments, stimulation is re-enabled after a predetermined amount of time after it had been disabled. In other examples, the shut-off controller 104 can be used to re-enable stimulation. In some such examples, the patient brings the shut-off controller 104 within a first distance of a sensor (e.g., a magnetic sensor) to disable stimulation, and then removes the shut-off controller 104. Subsequently, once the patient brings the shut-off controller 104 within a second distance of the sensor, stimulation can be re-enabled. In various embodiments, the first distance can be less than the second distance, equal to the second distance, or greater than the second distance. In still further embodiments, another device such as a separate turn-on controller (not shown) or the programmer 100 can be used to re-enable stimulation. Any combination of such re-enabling of stimulation can be used, such as alternatively using either the programmer 100 or the shut-off controller 104 to enable stimulation or combining a minimum "off" time before any other methods can be used to re-enable stimulation.

In some embodiments, rather than entirely disable stimulation, other actions can be taken, such as reducing the magnitude of stimulation. For example, in some embodiments, the shut-off sensor can be used to reduce the signal output by a predetermined amount (e.g., absolute amount, percentage, etc.). In other examples, the shut-off sensor can affect the transfer function of the signal processor to reduce the magnitude of stimulation in a customized way, such as according to frequency or other parameter of an input signal (e.g., from the middle ear sensor).

In some examples, implantable battery and/or communication module can be used to provide power and/or data (e.g., processing instructions) to other system components via lead 190. Different challenges exist for communicating electrical signals through a patient's body. For example, safety standards can limit the amount of current that can safely flow through a patient's body (particularly DC current). Additionally, the patient's body can act as an undesired signal path from component to component (e.g., via contact with the housing or "can" of each component).

Figure 5A:
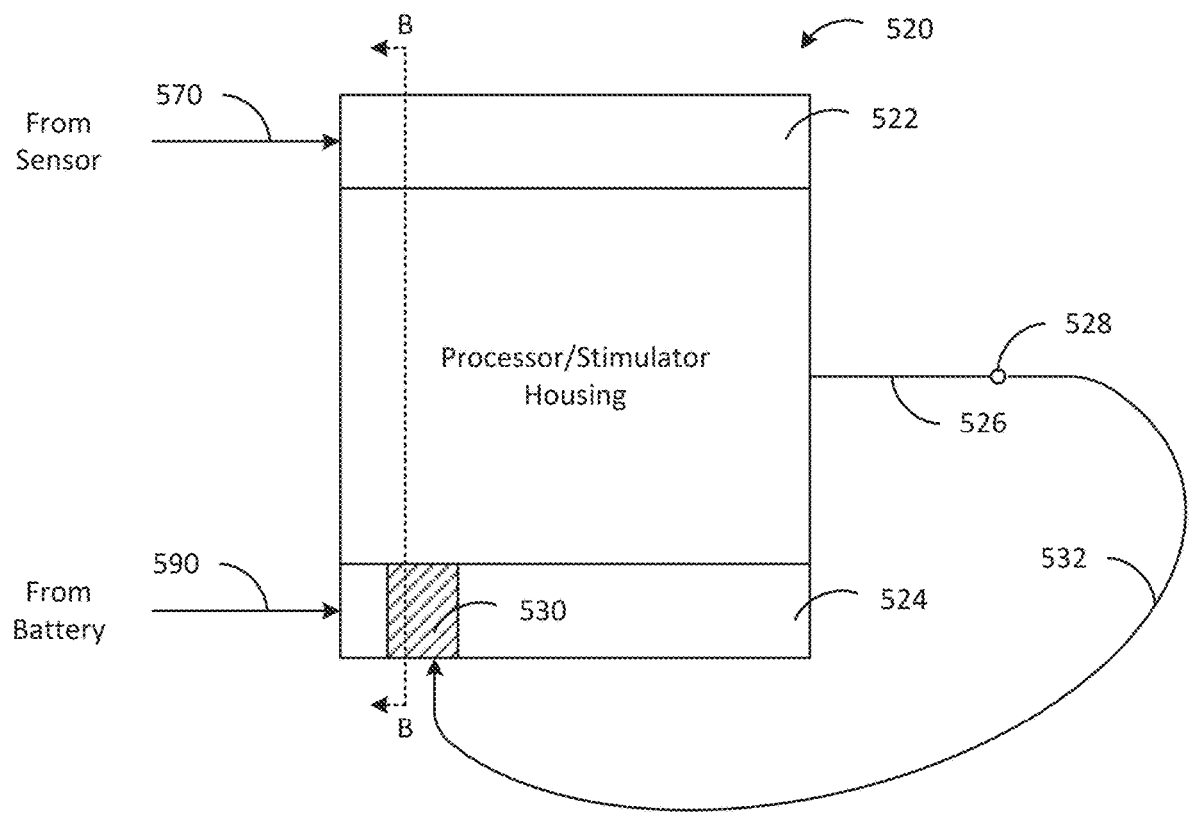
FIG. 5A is a high-level electrical schematic showing communication between the implantable battery and/or communication module and the signal processor.

While shown in several embodiments (e.g., FIGS. 1 and 4) as being separate components connected by a lead (e.g., lead 180), in some examples, the processor (e.g., 120) and the stimulator (e.g., 130) can be integrated into a single component, for example, within a hermetically sealed housing. FIG. 5A shows an exemplary schematic illustration of processor and stimulator combined into a single housing. In the example of FIG. 5A, the processor/stimulator 520 receives signal inputs from the sensor (e.g., a middle ear sensor) via lead 570 and power from a battery (e.g., the implantable battery and/or communication module) via lead 590. The processor/stimulator 520 can include headers 522, 524 for receiving leads 570, 590, respectively.

The processor/stimulator 520 can be configured to receive an input signal from the sensor, process the received input signal according to a transfer function, and output a stimulation signal via electrode 526. Electrode 526 can include one or more contact electrodes (e.g., 528) in contact with a wearer's cochlear tissue to provide electrical stimulation thereto, for example, as described with respect to FIG. 5B.

The processor/stimulator 520 of FIG. 5 includes a return electrode 530 for providing a return path (e.g., 532) for electrical stimulation emitted from electrode 526. The return electrode 530 can be electrically coupled to a ground portion of circuitry within the processor/stimulator 520 to complete a circuit comprising circuitry within the processor/stimulator 520, the electrode 526, the wearer's cochlear tissue, and ground. In some examples, the return electrode 530 comprises an electrically conductive material in electrical communication with circuitry inside the processor/stimulator 520, while the rest of the housing of the processor/stimulator 520 is generally not electrically coupled to internal circuitry.

In some embodiments, the return electrode 530 and the housing of the processor/stimulator 520 comprise electrically conductive materials. For instance, in some examples, the housing comprises titanium while the return electrode 530 comprises platinum or a platinum alloy. Header 524 can generally include a non-conductive biocompatible material, such as a biocompatible polymer. The non-conductive header 524 can provide isolation between the return electrode 530 and the conductive housing of the processor/stimulator 520.

While shown in FIG. 5A as being positioned in the power header 524 of the processor/stimulator 520, in general, the return electrode 530 can be positioned anywhere on the exterior surface of the processor/stimulator 520. In some examples, one or more redundant return electrodes can be included, for example, at or near the interface of the housing and the electrode 526. In some examples, a return electrode can be positioned on a proximal end of the electrode 526 itself. In some embodiments having a plurality of return electrodes (e.g., return electrode 530 and a return electrode on the proximal end of electrode 526), a switch can be used to select which return electrode is used. Additionally or alternatively, a plurality of return electrodes can be used simultaneously.

Figure 5B:
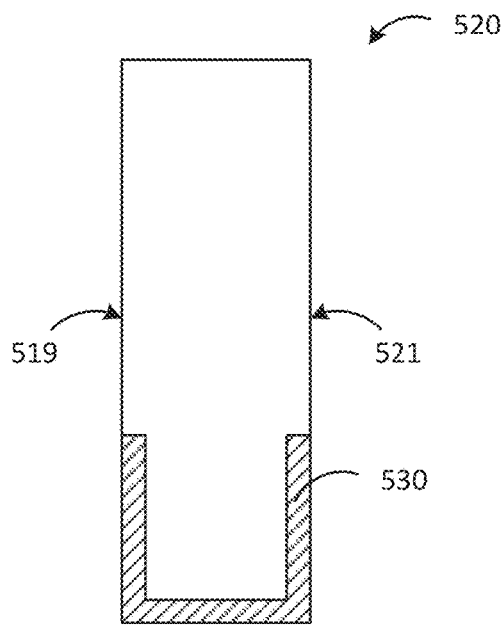
FIG. 5B illustrates an exemplary schematic diagram illustrating a cochlear electrode having a plurality of contact electrodes and fixedly or detachably connected to an electrical stimulator.

FIG. 5B shows a simplified cross-sectional view of the processor/stimulator shown in FIG. 5A taken along lines B-B. As shown in FIG. 5B, processor/stimulator 520 includes a housing having a first side 519 and a second side 521 and a return electrode 530 embedded in the housing. Return electrode 530 can comprise a conductive material suitable for contact with a wearer's tissue, such as platinum. In the illustrated example, the return electrode 530 wraps around to both sides of the housing of the processor/stimulator 520 so that the return electrode 530 is coupled to the outer surface of the housing on the first side 519 and the second side 521.

This can facilitate implanting onto either side of a wearer's anatomy, since in some cases, only one side of the processor/stimulator electrically contacts conductive tissue of the wearer while the other side contacts, for instance, the skull of the wearer, and does not easily provide the return path (e.g., 532). Thus, a single processor/stimulator design can be implanted in either side of a wearer's anatomy while providing an adequate return path via a return electrode 530.

In various examples, the return electrode 530 can extend around a perimeter edge of the processor/stimulator 520, as shown in FIG. 5B. In other examples, the return electrode 530 can include sections on either side of the housing and can be connected to one another internally within the housing rather than via a wrap-around contact. Additionally, while shown as being embedded in the housing of the processor/stimulator 520, in some examples, return electrode 530 can protrude outwardly from the housing. Return electrode 530 can generally be any of a variety of shapes and sizes while including an electrical contact section on opposing sides of the housing to provide usability on either side of a wearer's anatomy. In other embodiments, return electrode can be positioned only one side of the housing for a customized right-side or left-side implementation. Some features of a combined processor/stimulator and other cochlear implant system operation are described in U.S. patent application Ser. No. 16/797,388, filed Feb. 21, 2020, and entitled IMPLANTABLE COCHLEAR SYSTEM WITH INTEGRATED COMPONENTS AND LEAD CHARACTERIZATION, which is assigned to the assignee of the instant application and is incorporated herein by reference.

Figure 6A:
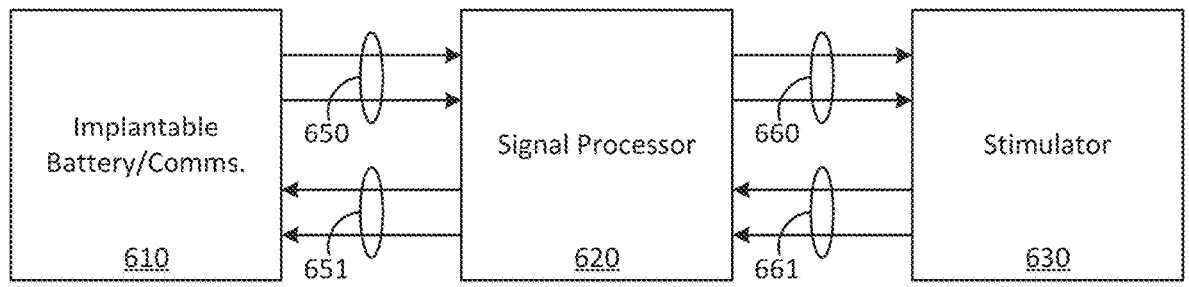
FIG. 6A shows a high-level schematic diagram illustrating an exemplary communication configuration between an implantable battery and/or communication module, a signal processor, and a stimulator.

FIG. 6A shows a high-level schematic diagram illustrating an exemplary communication configuration between an implantable battery and/or communication module, a signal processor, and a stimulator. In the example of FIG. 6A, the implantable battery and/or communication module 610 is in two-way communication with the signal processor 620. For instance, the implantable battery and/or communication module 610 can communicate power and/or data signals 650 to the signal processor 620. In some examples, the power and data signals 650 can be included in a single signal generated in the implantable battery and/or communication module 610 and transmitted to the signal processor 620. Such signals can include, for example, a digital signal transmitted with a particular clock rate, which in some embodiments, can be adjustable, for example, via the implantable battery and/or communication module 610.

In some embodiments, the signal processor 620 can communicate information to the implantable battery and/or communication module 610 (e.g., 651), for example, feedback information and/or requests for more power, etc. The implantable battery and/or communication module 610 can, in response, adjust its output to the signal processor 620 (e.g., an amplitude, duty cycle, clock rate, etc.) in order to accommodate for the received feedback (e.g., to provide more power, etc.). Thus, in some such examples, the implantable battery and/or communication module 610 can communicate power and data (e.g., 650) to the signal processor 620, and the signal processor 620 can communicate various data back to the implantable battery and/or communication module 610 (e.g., 651).

In some embodiments, similar communication can be implemented between the signal processor 620 and the stimulator 630, wherein the signal processor 620 provides power and data to the stimulator 630 (e.g., 660) and receives data in return from the stimulator 630 (e.g., 661). For example, the signal processor 620 can be configured to output signals (e.g., power and/or data) to the stimulator 630 (e.g., based on received inputs from a middle ear sensor or other device) via a similar communication protocol as implemented between the implantable battery and/or communication module 610 and the signal processor 620. Similarly, in some embodiments, the stimulator can be configured to provide feedback signals to the signal processor, for example, representative of an executed stimulation process. Additionally or alternatively, the stimulator may provide diagnostic information, such as electrode impedance and neural response telemetry or other biomarker signals.

Figure 6B:
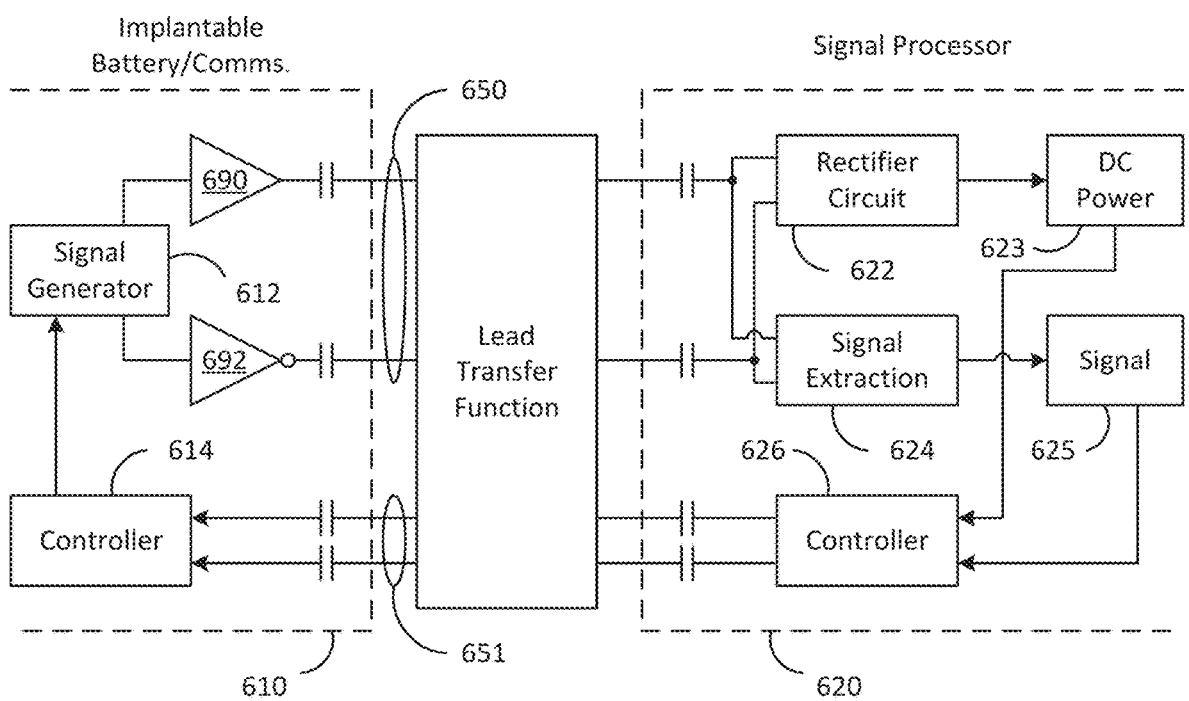
FIG. 6B is a schematic diagram illustrating exemplary electrical communication between an implantable battery and/or communication module and a signal processor in a cochlear implant system according to some embodiments.

FIG. 6B is a schematic diagram illustrating exemplary electrical communication between an implantable battery and/or communication module and a signal processor in a cochlear implant system according to some embodiments. In the illustrated embodiment, the implantable battery and/or communication module 610 includes a signal generator 612 configured to output a signal through a lead (e.g., 190) to the signal processor 620. As described with respect to FIG. 6A, in some examples, the signal generator 612 is configured to generate both data and power signals (e.g., 650) for communication to the signal processor 620. In some embodiments, the signal generator 612 generates a digital signal for communication to the signal processor 620. The digital signal from the signal generator 612 can be communicated to the signal processor 620 at a particular clock rate. In some examples, the signals are generated at approximately 30 kHz. In various examples, data and power frequencies can range from approximately 100 Hz to approximately 10 MHz, and in some examples, may be adjustable, for example, by a user.

In the illustrated embodiment, the implantable battery and/or communication module 610 includes a controller in communication with the signal generator 612. In some examples, the controller is capable of adjusting communication parameters such as the clock rate of the signal generator 612. In an exemplary embodiment, the controller and/or the signal generator 612 can communicate with, for example, a patient's external programmer (e.g., as shown in FIG. 1). The controller and/or signal generator 612 can be configured to communicate data to the signal processor 620 (e.g., 651), such as updated firmware, signal processor 620 transfer functions, or the like.

As shown, the signal generator 612 outputs the generated signal to an amplifier 690 and an inverting amplifier 692. In some examples, both amplifiers are unity gain amplifiers. In some examples comprising digital signals, the inverting amplifier 692 can comprise a digital NOT gate. The output from the amplifier 690 and the inverting amplifier 692 are generally opposite one another and are directed to the signal processor 620. In some embodiments, the opposite nature of the signals output to the signal processor 620 from amplifiers 690 and 692 results in a charge-neutral communication between the implantable battery and/or communication module 610 and the signal processor 620, such that no net charge flows through the wearer.

In the illustrated example of FIG. 6B, the receiving circuitry in the signal processor 620 comprises a rectifier circuit 622 that receives signals (e.g., 650) from the amplifier 690 and the inverting amplifier 692. Since the output of one of the amplifiers 690 and 692 will be high, the rectifier circuit 622 can be configured to receive the opposite signals from the amplifiers 690 and 692 and generate therefrom a substantially DC power output 623. In various embodiments, the DC power 623 can be used to power a variety of components, such as the signal processor 620 itself, the middle ear sensor, the electrical and/or acoustic stimulator, or the like. The rectifier circuit 622 can include any known appropriate circuitry components for rectifying one or more input signals, such as a diode rectification circuit or a transistor circuit, for example.

As described elsewhere herein, the implantable battery and/or communication module 610 can communicate data to the signal processor 620. In some embodiments, the controller and/or the signal generator 612 is configured to encode the data for transmission via the output amplifiers 690 and 692. The signal processor 620 can include a signal extraction module 624 configured to extract the data signal 625 from the signal(s) (e.g., 650) communicated to the signal processor 620 to produce a signal for use by the signal processor 620. In some examples, the signal extraction module 624 is capable of decoding the signal that was encoded by the implantable battery and/or communication module 610. Additionally or alternatively, the signal extraction module 624 can extract a signal 625 resulting from the lead transfer function. In various examples, the extracted signal 625 can include, for example, an updated transfer function for the signal processor 620, a desired stimulation command, or other signals that affect operation of the signal processor 620.

In the illustrated example, the signal processor 620 includes a controller 626 that is capable of monitoring the DC power 623 and the signal 625 received from the implantable battery and/or communication module 610. The controller 626 can be configured to analyze the received DC power 623 and the signal 625 and determine whether or not the power and/or signal is sufficient. For example, the controller 626 may determine that the signal processor 620 is receiving insufficient DC power for stimulating a cochlear electrode according to the signal processor 620 transfer function, or that data from the implantable battery and/or communication module 610 is not communicated at a desired rate. Thus, in some examples, the controller 626 of the signal processor 620 can communicate with the controller 614 of the implantable battery and/or communication module 610 and provide feedback regarding the received communication. Based on the received feedback from the controller 626 of the signal processor 620, the controller 614 of the implantable battery and/or communication module 610 can adjust various properties of the signal output by the implantable battery and/or communication module 610. For example, the controller of the implantable battery and/or communication module 610 can adjust the clock rate of the communication from the signal generator 612 to the signal processor 620.

In some systems, the transmission efficiency between the implantable battery and/or communication module 610 and the signal processor 620 is dependent on the clock rate of transmission. Accordingly, in some examples, the implantable battery and/or communication module 610 begins by transmitting at an optimized clock rate until a change in clock rate is requested via the signal processor 620, for example, to enhance data transmission (e.g., rate, resolution, etc.). In other instances, if more power is required (e.g., the controller of the signal processor 620 determines the DC power is insufficient), the clock rate can be adjusted to improve transmission efficiency, and thus the magnitude of the signal received at the signal processor 620. It will be appreciated that in addition or alternatively to adjusting a clock rate, adjusting an amount of power transmitted to the signal processor 620 can include adjusting the magnitude of the signal output from the signal generator 612. In some embodiments, for example, with respect to FIGS. 6A-B, power and data can be communicated, for example, from implantable battery and/or communication module 610 to the signal processor 620 at a rate of approximately 30 kHz, and can be adjusted from there as necessary and/or as requested, for example, by the signal processor 620.

Figure 7A:
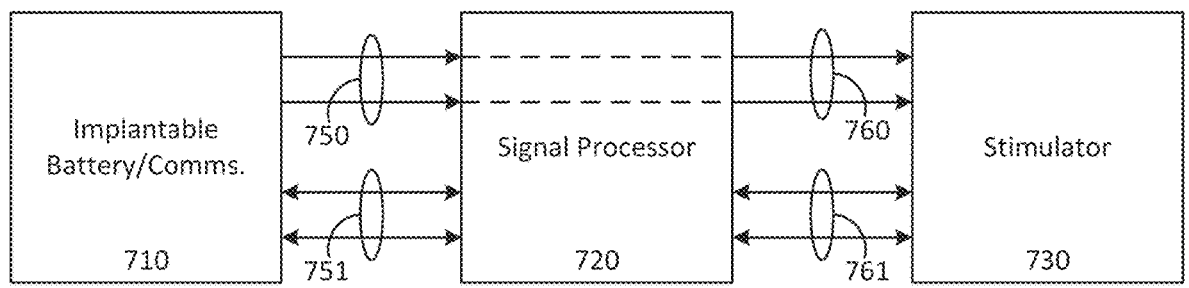
FIG. 7A is an alternative high-level schematic diagram illustrating an exemplary communication configuration between an implantable battery and/or communication module, a signal processor, and a stimulator.

FIG. 7A is an alternative high-level schematic diagram illustrating an exemplary communication configuration between an implantable battery and/or communication module, a signal processor, and a stimulator. In the example of FIG. 7A, the implantable battery and/or communication module 710 provides signals (e.g., 750) to the signal processor 720 via a first communication link and is further in two-way communication for providing additional signals (e.g., 751) with the signal processor 720. In the example of FIG. 7A, the implantable battery and/or communication module 710 can provide power signals (e.g., 750) to the signal processor 720 via a communication link and otherwise be in two-way data communication (751) with the signal processor 720 via a second communication link. In some such examples, the power (750) and data (751) signals can each include digital signals. However, in some embodiments, the power and data signals are transmitted at different clock rates. In some examples, the clock rate of the data signals is at least one order of magnitude greater than the clock rate of the power signals. For example, in an exemplary embodiment, the power signal is communicated at a clock rate of approximately 30 kHz, while the data communication occurs at a clock rate of approximately 1 MHz. Similarly to the embodiment described in FIG. 6A, in some examples, the clock rate can be adjustable, for example, via the implantable battery and/or communication module 710.

As described with respect to FIG. 6A, in some embodiments, the signal processor 720 can communicate information to the implantable battery and/or communication module 710, for example, feedback information and/or requests for more power, etc. (e.g., data signals 751). The implantable battery and/or communication module 710 can, in response, adjust the power and/or data output to the signal processor 720 (e.g., an amplitude, duty cycle, clock rate, etc.) in order to accommodate for the received feedback (e.g., to provide more power, etc.).

In some embodiments, similar communication can be implemented between the signal processor 720 and the stimulator 730, wherein the signal processor 720 provides power and data to the stimulator 730 and receives data in return from the stimulator 730. For example, the signal processor 720 can be configured to output power signals (e.g., 760) and data signals (e.g., 761) to the stimulator 730 (e.g., based on received inputs from a middle ear sensor or other device). Such communication can be implemented via a similar communication protocol as implemented between the implantable battery and/or communication module 710 and the signal processor 720. In some examples, the power signals provided to the stimulator 730 (e.g., 760) are the same signals (e.g., 750) received by the signal processor 720 from the implantable battery and/or communication module 710. Additionally, in some embodiments, the stimulator 730 can be configured to provide feedback signals to the signal processor 720 (e.g., 761), for example, representative of an executed stimulation process.

Figure 7B:
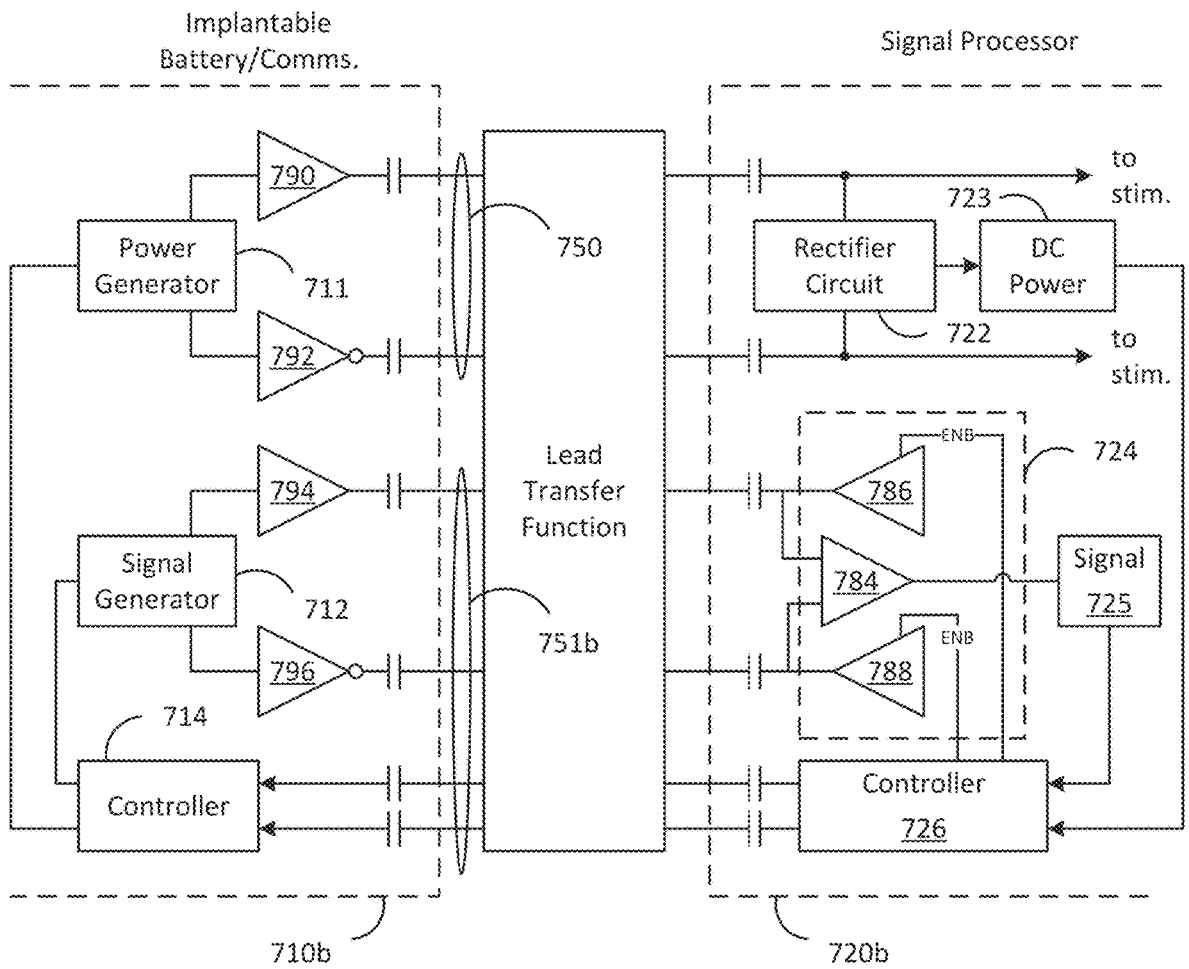
FIG. 7B is an alternative schematic diagram illustrating exemplary electrical communication between an implantable battery and/or communication module and a signal processor in a cochlear implant system.

FIG. 7B is an alternative schematic diagram illustrating exemplary electrical communication between an implantable battery and/or communication module 710b and a signal processor 720b in a cochlear implant system similar to that shown in FIG. 7A. In the illustrated embodiment of FIG. 7B, the implantable battery and/or communication module 710b includes a power signal generator 711 and a separate signal generator 712. The power signal generator 711 and signal generator 712 are each configured to output a signal through a lead (e.g., 190) to the signal processor 720b. In some embodiments, the power signal generator 711 and the signal generator 712 each generates a digital signal for communication to the signal processor 720b. In some such embodiments, the digital signal (e.g., 750) from the power signal generator 711 can be communicated to the signal processor 720b at a power clock rate, while the digital signal (e.g., 751b) from the signal generator 712 can be communicated to the signal processor 720b at a data clock rate that is different from the power clock rate. For instance, in some configurations, power and data can be communicated most effectively and/or efficiently at different clock rates. In an exemplary embodiment, the power clock rate is approximately 30 kHz while the data clock rate is approximately 1 MHz. Utilizing different and separately communicated power and data signals having different clock rates can increase the transfer efficiency of power and/or data from the implantable battery and/or communication module 710b to the signal processor 720b.

In the illustrated embodiment, the implantable battery and/or communication module 710b includes a controller 714 in communication with the power signal generator 711 and the signal generator 712. In some examples, the controller 714 is capable of adjusting communication parameters such as the clock rate or content of the signal generator 712 and/or the power signal generator 711. In an exemplary embodiment, the controller 714 and/or the signal generator 712 or power signal generator 711 can communicate with, for example, a patient's external programmer (e.g., as shown in FIG. 1). The controller 714 and/or signal generator 712 can be configured to communicate data to the signal processor 720b, such as updated firmware, signal processor 720b transfer functions, or the like. Additionally or alternatively, the controller 714 can be configured to transmit signals such as audio or other signals streamed or otherwise received from one or more external devices as described elsewhere herein.

As shown, and similar to the example shown in FIG. 6B, the power signal generator 711 outputs the generated signal to an amplifier 790 and an inverting amplifier 792. In some examples, both amplifiers are unity gain amplifiers. In some examples comprising digital signals, the inverting amplifier 792 can comprise a digital NOT gate. The output from the amplifier 790 and the inverting amplifier 792 are generally opposite one another and are directed to the signal processor 720b. In the illustrated example, the receiving circuitry in the signal processor 720b comprises a rectifier circuit 722 that receives signals from the amplifier 790 and the inverting amplifier 792. Since the output of one of the amplifiers 790 and 792 will be high, the rectifier circuit 722 can be configured to receive the opposite signals from the amplifiers 790 and 792 and generate therefrom a substantially DC power output 723.

In various embodiments, the DC power 723 can be used to power a variety of components, such as the signal processor 720b itself, the middle ear sensor, the electrical and/or acoustic stimulator 730, or the like. The rectifier circuit 722 can include any known appropriate circuitry components for rectifying one or more input signals, such as a diode rectification circuit or a transistor circuit, for example. In some embodiments, signals from the power signal generator 711 are generated at a clock rate that is optimal for transmitting power through the lead (e.g., approximately 30 kHz). In the illustrated example of FIG. 7B, the rectifier circuit 722 can be arranged in parallel with power lines that are configured to communicate power signals to other components within the system, such as the stimulator 730, for example. For instance, in some embodiments, the same power signal (e.g., 750) generated from the power signal generator 711 and output via amplifiers 790 and 792 can be similarly applied to the stimulator 730. In some such examples, the stimulator 730 includes a rectifier circuit 722 similar to the signal processor 720b for extracting DC power from the power signal and the inverted power signal provided by amplifiers 790 and 792, respectively. In alternative embodiments, the signal processor 720b can similarly provide signals from a separate power signal generator 711 to provide power signals (e.g., at approximately 30 kHz) to the stimulator 730 similar to how power is provided from the implantable battery and/or communication module 710b to the signal processor 720b in FIG. 7B.

In the example of FIG. 7B, the signal generator 712 outputs a data signal (e.g., 751b) to an amplifier 794 and an inverting amplifier 796. In some examples, both amplifiers are unity gain amplifiers. In some examples comprising digital signals, the inverting amplifier 796 can comprise a digital NOT gate. The output from the amplifier 794 and the inverting amplifier 796 are generally opposite one another and are directed to the signal processor 720b.

As described elsewhere herein, in some embodiments, the controller 714 and/or the signal generator 712 is configured to encode data for transmission via the output amplifiers 794 and 796. The signal processor 720b can include a signal extraction module 724 configured to extract the data from the signal(s) 725 communicated to the signal processor 720b to produce a signal 725 for use by the signal processor 720b. In some examples, the signal extraction module 724 is capable of decoding the signal that was encoded by the implantable battery and/or communication module 710b. Additionally or alternatively, the signal extraction module 724 can extract a resulting signal 725 resulting from the lead transfer function. In various examples, the extracted signal can include, for example, an updated transfer function for the signal processor 720b, a desired stimulation command, or other signals that affect operation of the signal processor 720b.

In the example of FIG. 7B, the signal extraction module 724 includes a pair of tri-state buffers 786 and 788 in communication with signals output from the signal generator 712. The tri-state buffers 786 and 788 are shown as having "enable" (ENB) signals provided by controller 726 in order to control operation of the tri-state buffers 786 and 788 for extracting the signal from the signal generator 712. Signals from the signal generator 712 and buffered by tri-state buffers 786 and 788 are received by amplifier 784, which can be configured to produce a signal 725 representative of the signal generated by the signal generator 712.

In some examples, communication of signals generated at the signal generator 712 can be communicated to the signal processor 720b at a clock rate that is different from the clock rate of the signals generated by the power signal generator 711. For instance, in some embodiments, power signals from the power signal generator 711 are transmitted at approximately 30 kHz, which can be an efficient frequency for transmitting power. However, in some examples, the signals from the signal generator 712 are transmitted at a higher frequency than the signal from the power signal generator 711, for example, at approximately 1 MHz. Such high frequency data transmission can be useful for faster data transfer than would be available at lower frequencies (e.g., the frequencies for transmitting the signal from the power signal generator 711). Thus, in some embodiments, power and data can be communicated from the implantable battery and/or communication module 710b to the signal processor 720b via different communication channels at different frequencies.

Similar to the embodiment shown in FIG. 6B, in the illustrated example of FIG. 7B, the signal processor 720b includes a controller 726 that is in communication with the implantable battery and/or communication module 710b. In some such embodiments, the controller 726 in the signal processor 720b is capable of monitoring the DC power 723 and/or the signal 725 received from the implantable battery and/or communication module 710b. The controller 626 can be configured to analyze the received DC power 723 and the signal 725 and determine whether or not the power and/or signal is sufficient. For example, the controller 726 may determine that the signal processor 720b is receiving insufficient DC power for stimulating a cochlear electrode according to the signal processor 720b transfer function, or that data from the implantable battery and/or communication module 710b is not communicated at a desired rate. Thus, in some examples, the controller 726 of the signal processor 720b can communicate with the controller 714 of the implantable battery and/or communication module 710b and provide feedback regarding the received communication. Based on the received feedback from the controller 726 of the signal processor 720b, the controller 714 of the implantable battery and/or communication module 710b can adjust various properties of the signals output by the power generator 711 and/or the signal generator 712.

In the illustrated example of FIG. 7B, bidirectional communication signals 751b between the implantable battery and/or communication module 710b and signal processor 720b comprises signals from the amplifiers 794 and 796 in one direction, and communication from controller 726 to controller 714 in the other direction. It will be appreciated that a variety of communication protocols and techniques can be used in establishing bidirectional communication signals 751b between the implantable battery and/or communication module 710b and signal processor 720b.

For example, in some embodiments, the signal processor includes amplifiers similar to 794 and 796, and outputs a signal and its inverse back to the implantable battery and/or communication module 710b. Additionally or alternatively, in some embodiments, the signal generator 712 can be integral with the controller 714 and/or the signal extraction module 724 can be integral with controller 726, wherein controllers 714 and 726 can be in bidirectional communication via signal generator 712 and/or the signal extraction module 724. In general, the implantable battery and/or communication module 710b and the signal processor 720b can be in bidirectional communication for communicating data signals separate from the power signals provided by power signal generator 711.

As described, separate communication channels for power (e.g., 750) and data (e.g., 751b) can be used for providing both power and data from the implantable battery and/or communication module 710b and the signal processor 720b. This can allow for separate data and power clocking rates in order to improve the power transmission efficiency as well as the data transmission efficiency and/or rate. Moreover, in some examples, if the bidirectional communication (e.g., 751b) between the implantable battery and/or communication module 710b and the signal processor 720b fails (e.g., due to component failure, connection failure, etc.), data for communication from the implantable battery and/or communication module 710b can be encoded in the power signals (e.g., 750) from the power signal generator 711 and transmitted to the signal processor 720b. Thus, similar to the embodiment described with respect to FIG. 6B, both power and data can be transmitted via the same signal.

In some examples, the signal extraction module 724 can be configured to receive data received from the power signal generator 711, for example, via an actuatable switch that can be actuated upon detected failure of communication 751b. In other examples, the signal extraction module 724 and/or the controller 726 can generally monitor data from the power signal generator 711 and identify when signals received from the power signal generator 711 include data signals encoded into the received power signal in order to determine when to consider the power signals to include data.

Accordingly, in some embodiments, the configuration of FIG. 7B can be implemented to establish efficient, bidirectional communication between the implantable battery and/or communication module 710b and the signal processor 720b. Failure in bidirectional communication 751b can be identified manually and/or automatically. Upon detection of failure in the bidirectional communication 751b, the controller 714 can encode data into the power signal output from the power signal generator 711, and power and data can be combined into a single signal such as described with respect to FIG. 6B.

Figure 7C:
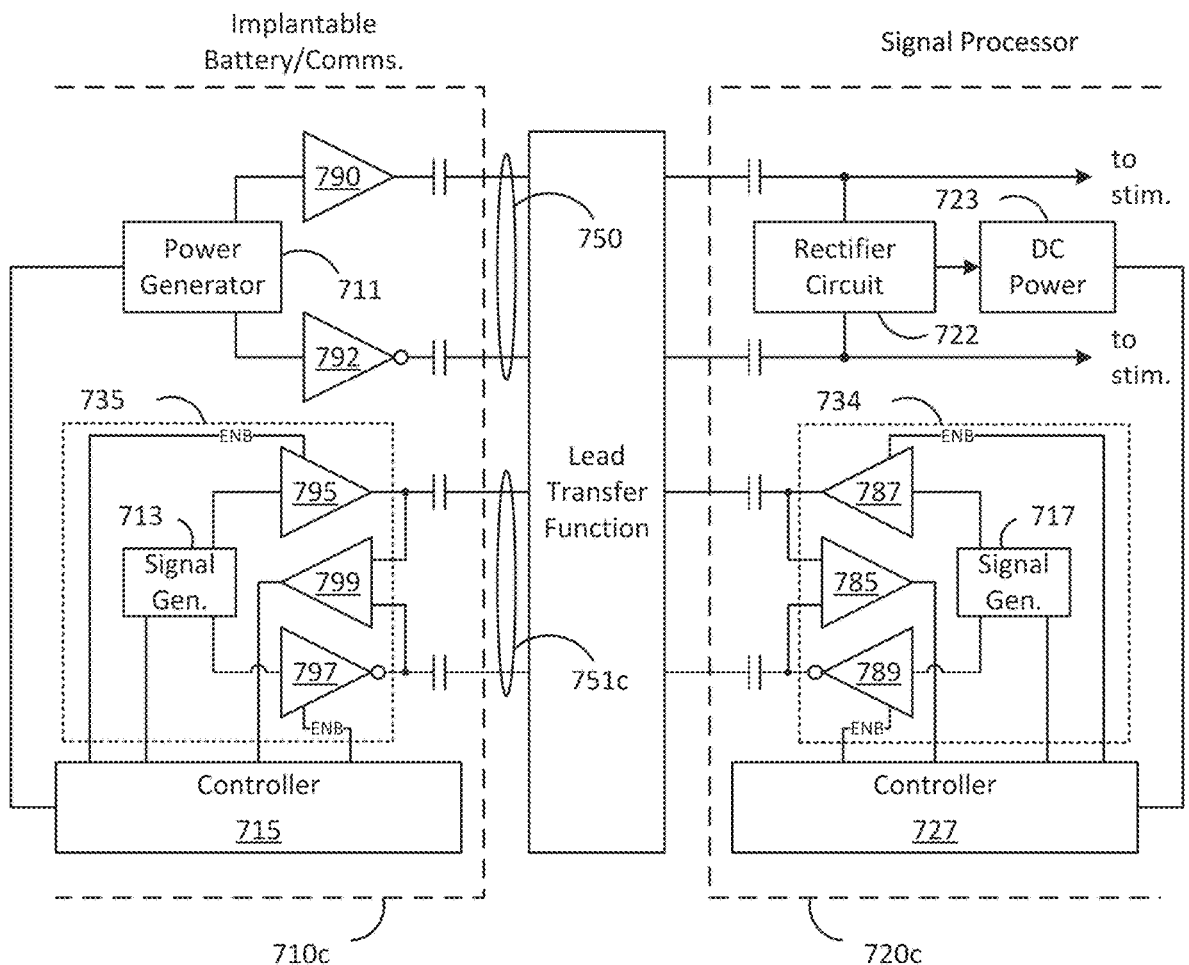
FIG. 7C is another alternative schematic diagram illustrating exemplary electrical communication between an implantable battery and/or communication module and a signal processor in a cochlear implant system.

FIG. 7C is another alternative schematic diagram illustrating exemplary electrical communication between an implantable battery and/or communication module 710c and a signal processor 720c in a cochlear implant system similar to that shown in FIG. 7A. Similar to the embodiment of FIG. 7B, in the illustrated embodiment of FIG. 7C, the implantable battery and/or communication module 710c includes a power signal generator 711 configured to output a signal through a lead (e.g., 190) to the signal processor 720c. In some embodiments, the power signal generator 711 generates a digital signal (e.g., 750) for communication to the signal processor 720c, for example, at a power clock rate. The power signal generator 711 and corresponding amplifiers 790, 792, as well as rectifier circuit 722, can operate similar to described with respect to FIG. 7B in order to extract DC power 723 and, in some examples, output power signals to further system components, such as stimulator 730.

In the illustrated embodiment, the implantable battery and/or communication module 710c includes a signal generator 713, which can be capable of providing data signals to the signal processor. In some embodiments, the signal generator 713 generates a digital signal for communication to the signal processor 720c. In some such embodiments, the digital signal (e.g., 751c) from the signal generator 713 can be communicated to the signal processor 720b at a data clock rate that is different from the power clock rate. For instance, as described elsewhere herein, in some configurations, power and data can be communicated most effectively and/or efficiently at different clock rates. In an exemplary embodiment, the power clock rate is approximately 30 kHz while the data clock rate is approximately 1 MHz. Utilizing different and separately communicated power and data signals having different clock rates can increase the transfer efficiency of power and/or data from the implantable battery and/or communication module 710c to the signal processor 720c.

The embodiment of FIG. 7C includes a controller 715 in communication with the power signal generator 711 and the signal generator 713. In some examples, the controller 715 is capable of adjusting communication parameters such as the clock rate or content of the signal generator 713 and/or the power signal generator 711. In an exemplary embodiment, the controller 715 and/or the signal generator 713 or power signal generator 711 can communicate with, for example, a patient's external programmer (e.g., as shown in FIG. 1). The controller 715 and/or signal generator 713 can be configured to communicate data to the signal processor 720c, such as updated firmware, signal processor 720c transfer functions, or the like.

Similar to the example in FIG. 7B, in the example of FIG. 7C, the signal generator 713 outputs a data signal (e.g., 751) to an amplifier 795 and an inverting amplifier 797. In some examples, both amplifiers are unity gain amplifiers. In some examples, amplifiers 795, 797 comprise tri-state buffers. In some examples comprising digital signals, the inverting amplifier 797 can comprise a digital NOT gate. The output from the amplifier 795 and the inverting amplifier 797 are generally opposite one another and are directed to the signal processor 720c.

As described elsewhere herein, in some embodiments, the controller 715 and/or the signal generator 713 is configured to encode data for transmission via the amplifiers 795 and 797. The signal processor 720c can include a signal extraction module 734 configured to extract the data from the signal(s) communicated to the signal processor 720c to produce a signal for use by the signal processor 720c. In some examples, the signal extraction module 734 is capable of decoding the signal that was encoded by the implantable battery and/or communication module 710c. Additionally or alternatively, the signal extraction module 734 can extract a signal resulting from the lead transfer function. In various examples, the extracted signal can include, for example, an updated transfer function for the signal processor 720c, a desired stimulation command, or other signals that affect operation of the signal processor 720c.

In the example of FIG. 7C, similar to signal extraction module 724 in FIG. 7B, the signal extraction module 734 includes a pair of tri-state buffers 787 and 789 in communication with signals output from the signal generator 713. The tri-state buffers 787 and 789 are shown as having "enable" (ENB) signals provided by controller 727 in order to control operation of the tri-state buffers 787 and 789 for extracting the signal from the signal generator 713. Signals from the signal generator 713 and buffered by tri-state buffers 787 and 789 are received by amplifier 785, which can be configured to produce a signal representative of the signal generated by the signal generator 713.

As described elsewhere herein, in some examples, communication of signals generated at the signal generator 713 can be communicated to the signal processor 720c at a clock rate that is different from the clock rate of the signals generated by the power signal generator 711. For instance, in some embodiments, power signals from the power signal generator 711 are transmitted at approximately 30 kHz, which can be an efficient frequency for transmitting power. However, in some examples, the signals from the signal generator 713 are transmitted at a higher frequency than the signal from the power signal generator 711, for example, at approximately 1 MHz. Such high frequency data transmission can be useful for faster data transfer than would be available at lower frequencies (e.g., the frequencies for transmitting the signal from the power signal generator 711). Thus, in some embodiments, power and data can be communicated from the implantable battery and/or communication module 710c to the signal processor 720c via different communication channels at different frequencies.

In the illustrated example of FIG. 7C, the signal processor 720c includes a signal generator 717 and controller 727 that is in communication with the signal generator 717. Similar to the operation of signal generator 713 and amplifiers 795 and 799, the signal generator can be configured to produce output signals to buffers 787 and 789, which can be configured to output signals to the implantable battery and/or communication module 710c.

In some embodiments, the controller 727 in the signal processor 720c is capable of monitoring the DC power 723 and/or the signal received from the implantable battery and/or communication module 710c. The controller 626 can be configured to analyze the received DC power 723 and the signal and determine whether or not the power and/or signal is sufficient. For example, the controller 727 may determine that the signal processor 720c is receiving insufficient DC power for stimulating a cochlear electrode according to the signal processor 720c transfer function, or that data from the implantable battery and/or communication module 710c is not communicated at a desired rate. Thus, in some examples, the controller 727 of the signal processor 720c cause the signal generator 717 to generate communication signals to send to implantable battery and/or communication module 710c. Such signals can be used to provide feedback regarding signals received by the signal processor 720c, such as the DC power 723.

In the example of FIG. 7C, amplifiers 795 and 797 are shown as including tri-state amplifiers (e.g., tri-state buffers) controllable by the controller 727. Similar to the configuration in the signal processor 720c, the implantable battery and/or communication module 710c includes a signal extraction module 735 configured to extract data from the signal(s) communicated to the implantable battery and/or communication module 710c from signal generator 717 of the signal processor 720c. The signal extraction module 735 includes amplifiers 795 and 797 (e.g., tri-state buffers) in communication with signals output from the signal generator 717. Signals from the signal generator 717 and received at amplifiers 795 and 797 are received by amplifier 799, which can be configured to produce a signal representative of the signal generated by the signal generator 717 to controller 715 of the implantable battery and/or communication module 710. Thus, in some embodiments, the controller 727 of the signal processor 720c is configured to communicate data back to the implantable battery and/or communication module 710a via buffers 787 and 789.

As described with respect to other embodiments, based on the received feedback from the controller 727 of the signal processor 720c, the controller 715 of the implantable battery and/or communication module 710c can adjust various properties of the signals output by the power signal generator 711 and/or the signal generator 713.

Thus, in the illustrated example of FIG. 7C, bidirectional communication signal 751 between the implantable battery and/or communication module 710c and signal processor 720c includes communication between different signal extraction modules 735 and 734. As shown, both the implantable battery and/or communication module 710c and the signal processor 720c include a controller (715, 727) that communicates with a signal generator (713, 717) for producing output signals. The signal generator (713, 717) outputs signals via tri-state amplifiers, including one inverting amplifier (797, 789) for communication across bidirectional communication 751c for receipt by the other signal extraction module (734, 735).

Thus, in some embodiments, bidirectional communication 751c between the implantable battery and/or communication module 710c and the signal processor 720c can be enabled by each of the implantable battery and/or communication module and the signal processor receiving and transmitting data via approximately the same communication structure as the other. In some such examples, the implantable battery and/or communication module 710c and the signal processor 720c include data extraction modules 735 and 734, respectively, configured both to output signals from a signal generator (e.g., via signal generator 713 or signal generator 717) and receive and extract signals (e.g., via amplifier 785 and amplifier 799).

In the example of FIG. 7C, amplifiers 795 and 797 comprise tri-state amplifiers that selectively (e.g., via "enable" control from controller 715) output the signal from signal generator 713, and amplifier 797 is shown as an inverting amplifier. As described, in some examples, amplifiers 795 and 797 comprise tri-state buffers. Similarly, of tri-state buffers 787 and 789 that selectively (e.g., via "enable" control from controller 727) output the signal from signal generator 717, buffer 789 is shown as an inverting amplifier. As described elsewhere herein, communicating a signal and its inverse (e.g., via 795 and 797) allows communication with no net charge flow between the implantable battery and/or communication module 710c and the signal processor 720c. Thus, bidirectional communication between the implantable battery and/or communication module 710c and the signal processor 720c can be performed without a net charge flow between the components.

As described elsewhere herein, power from power generator 711 and data from signal generator 713 (and/or signal generator 717) can be communicated at different clocking rates to optimize power and data transfer. In some examples, if data communication (e.g., via bidirectional communication 751c) fails, the controller 715 can be configured to control power generator 711 to provide both power and data signals via amplifiers 790 and 792, for example, as described with respect to FIG. 6B.

Accordingly, in some embodiments, the configuration of FIG. 7C can be implemented to establish efficient, bidirectional communication between the implantable battery and/or communication module 710 and the signal processor 720. Failure in bidirectional communication 751 can be identified manually and/or automatically. Upon detection of failure in the bidirectional communication 751, the controller 715 can encode data into the power signal output from the power signal generator 711, and power and data can be combined into a single signal such as described with respect to FIG. 6B.

As discussed elsewhere herein, different safety standards can exist regarding electrical communication within the patient's body. For example, safety standards can limit the amount of current that can safely flow through a patient's body (particularly DC current). As shown in FIGS. 6B, 7B, and 7C, each of the illustrated communication paths between the implantable battery and/or communication module and the signal processor are coupled to output capacitors. The capacitors positioned at the inputs and outputs of the implantable battery and/or communication module and the signal processor can substantially block DC current from flowing therebetween while permitting communication of AC signals.

As described elsewhere herein, in some embodiments, the data communicated between the implantable battery and/or communication module and the signal processor (e.g., from the signal generator) is encoded. In some such examples, the encoding can be performed according to a particular data encoding method, such as an 8*b*/10*b* encoding scheme, to achieve DC balance in the communicated signal. For example, in some embodiments, data is encoded such that the numbers of high and low bits communicated between components at each clock signal meet certain criteria to prevent a charge of a single polarity from building up on any of the capacitors. Such encoding can minimize the total charge that flows between the implantable battery and/or communication module and the signal processor during communication.

While described and illustrated as representing communication between the implantable battery and/or communication module and the signal processor, it will be appreciated that communication configurations such as shown in FIGS. 6A, 6B, 7A, 7B, and 7C can be implemented between any pair of devices generally in communication with one another. For example, isolating circuitry can be included in any of the system components (e.g., middle ear sensor, acoustic stimulator, electrical stimulator, etc.) to effectively isolate the ground signals from each component from its respective can. Similarly, the exemplary capacitive AC coupling with DC blocking capacitors and DC balancing encoding as described elsewhere herein can be incorporated as the communication interface between any two communicating components.

As described, data can be communicated from the implantable battery and/or communication module to the signal processor for a variety of reasons. In some examples, data is that communicated to the implantable battery and/or communication module from an external component, such as a programmer as shown in FIG. 1. In an exemplary process, a programmer, such as a clinician's computer, can be used to communicate with a patient's fully implanted system via a communication configuration such as shown in FIG. 6B, 7B, or 7C. For example, a programmer can communicate wirelessly (e.g., via Bluetooth or other appropriate communication technique) with the patient's implantable battery and/or communication module. Signals from the programmer can be sent from the implantable battery and/or communication module to the signal processor via the communication configurations of FIG. 6B, 7B, or 7C.

During such processes, a clinician can communicate with the signal processor, and, in some cases, with other components via the signal processor. For example, the clinician can cause the signal processor to actuate an electrical and/or an acoustic stimulator in various ways, such as using various electrical stimulation parameters, combinations of active contact electrodes, various acoustic stimulation parameters, and various combinations thereof. Varying the stimulation parameters in real time can allow the clinician and patient to determine effectiveness of different stimulation techniques for the individual patient. Similarly, the clinician can communicate with the signal processor to update transfer function. For example, the clinician can repeatedly update the transfer function signal processor while testing the efficacy of each one on the individual patient. In some examples, combinations of stimulation parameters and signal processor transfer functions can be tested for customized system behavior for the individual patient.

In some embodiments, various internal properties of the system may be tested. For instance, various impedance values, such as a sensor impedance or a stimulator impedance can be tested such as described in U.S. Patent Publication No. 2015/0256945, entitled TRANSDUCER IMPEDANCE MEASUREMENT FOR HEARING AID, which is assigned to the assignee of the instant application, the relevant portions of which are incorporated by reference herein.

Figure 7D:
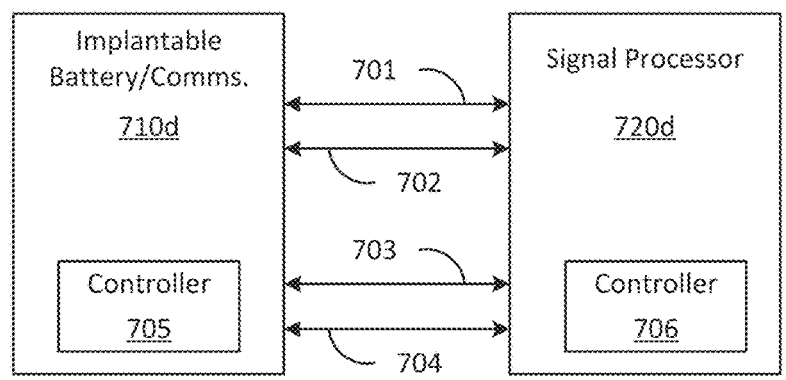
FIG. 7D is high-level schematic diagram illustrating exemplary electrical communication between an implantable battery and/or communication module and a signal processor in a cochlear implant system.

Additionally or alternatively, various characteristics of individual leads can be analyzed. FIG. 7D is high-level schematic diagram illustrating exemplary electrical communication between an implantable battery and/or communication module and a signal processor in a cochlear implant system similar to that shown in FIG. 7A. In the simplified example of FIG. 7D, conductors 701, 702, 703, and 704 extend between implantable battery and/or communication module 710*d* and signal processor 720*d*. In some examples, such conductors are included in a lead (e.g., lead 190) extending between the implantable battery and/or communication module 710*d* and signal processor 720*d*. In the example of FIG. 7D, implantable battery and/or communication module 710*d* includes controller 705 and signal processor 720*d* includes controller 706. Other internal components of the implantable battery and/or communication module 710*d* and signal processor 720*d* are not shown, though various configurations are possible, such as shown in FIG. 6B, 7B, or 7C.

In some embodiments, one or both of controllers 705, 706 can be configured to apply a test signal to one or more of conductors 701, 702, 703, 704 in order to test one or more properties of such conductors. In an exemplary test process, a controller (e.g., 705) can drive a signal (e.g., a sine wave or other shaped wave) across a conductor (e.g., 701) and measure the sent current and the voltage at which the current is sent. From this information, the controller can determine conductor impedance, including integrity of the conductor (e.g., whether or not the conductor is broken). Similarly, a controller can be configured to ground a second conductor (e.g., 702) while driving the test signal across a test conductor (e.g., 701) in order to measure one or more electrical parameters between the two conductors (e.g., capacitance, impedance, etc.).

During exemplary operation, a controller can be configured to apply a test signal to a first conductor (e.g., 701) and ground a second conductor (e.g., 702). The controller can be configured to apply a test signal at a plurality of frequencies (e.g., perform a frequency sweep) and measure impedance vs. frequency between the first conductor and the second, grounded conductor. In various examples, a controller can be configured to perform such tests using any two conductors 701, 702, 703, 704, to test for baseline values (e.g., when the system is in a known working condition) or to test for expected values (e.g., to compare to an established baseline). In different embodiments, the controller in the implantable battery and/or communication module 710*d* (controller 705) and/or the controller in the signal processor 720*d* (controller 706) can perform the grounding of one or more conductors and/or apply the test signal to one or more conductors.

In some embodiments, such test processes can be performed automatically, for example, according to a programmed schedule. Additionally or alternatively, such test processes can be initiated manually, for example, by a wearer or a clinician, via an external device such as via a programmer (e.g., 100) or charger (e.g., 102). The results of such processes can be stored in an internal memory for later access and analysis, and/or can output to an external device for viewing. In some examples, results and/or a warning can be output to an external device automatically in the event that one or more results deviates sufficiently from a baseline value. In various examples, sufficient variation from the baseline for triggering an output can be based on a percent variation from the baseline (e.g., greater than 1% deviation from be baseline, greater than 5% deviation, greater than 10% deviation, etc.). Additionally or alternatively, sufficient variation an include varying a certain number of standard deviations from the baseline (e.g., greater than one standard deviation, two standard deviations, etc.). In various embodiments, the amount of variation that triggers outputting the results and/or a warning is adjustable. Additionally or alternatively, such an amount can vary between different measurements.

In some embodiments, one or more actions may be performed in response to the results of such an analysis. For instance, in an exemplary embodiment described with respect to FIG. 7B, if a test reveals an unexpected impedance on one of the signal conductors (e.g., from amplifier 794 or inverting amplifier 796), such as an open circuit, the controller 714 may be configured to change operation of the system. For instance, controller 714 can be configured to adjust the output from power generator 711 in order to provide both power and data signals from the power generator 711, such as described with respect to the configuration in FIG. 6B. In some examples, the controller 714 can be configured to transmit a signal to an external device signaling such a change in operation and/or alerting a wearer and/or clinician that one or more conductors may be damaged or otherwise not operational.

Figure 8A:
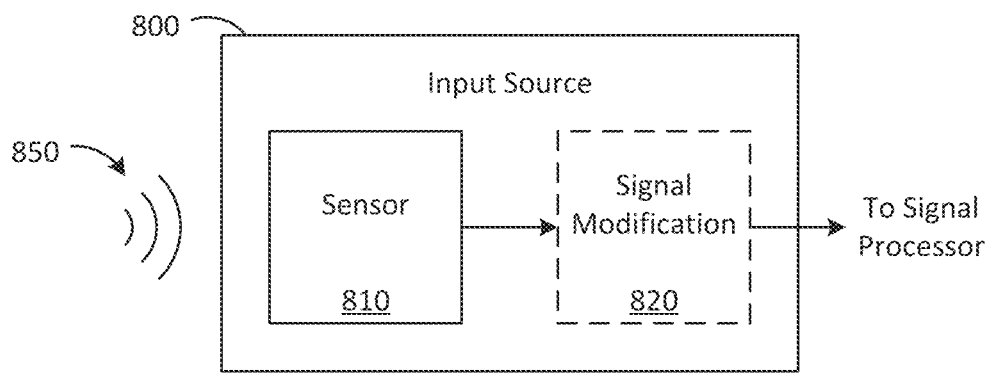
FIG. 8A is a schematic diagram illustrating an input source and its various components.

As discussed elsewhere herein, an input source can include a sensor configured to output a signal representative of an acoustic stimulus input received by the sensor. For example, in FIG. 8A, input source 800 comprises a sensor 810, which is configured to receive acoustic stimuli 850 and is further configured to output a signal representative of the received acoustic stimuli 850. In some embodiments, the signal representative of sound received by the sensor 810 can be sent to a signal processor (e.g., 120 of FIG. 4) which can be configured to perform further processing on the signal from the sensor 810. In such embodiments, the signal representative of sound received by the sensor is an input signal received by the signal processor. While the sensor 810 of the input source can be any type of sensor, in some embodiments, the input source comprises a passive sensor, such as a piezoelectric transducer, which is configured to output a signal indicative of an acoustic stimulus. In examples where the sensor 810 is a passive sensor, the input source may not require power to operate.

However, in some cases, a signal provided by a passive sensor is relatively small and can be impacted by noise within the system. For example, in some embodiments, electrical stimulation provided by a stimulator can be picked up by one or more system components, such as wires connecting the input source to the signal processor (e.g., lead 170 in FIG. 1). Electrical stimulation picked up by the wires can introduce unwanted noise, such as electrical interference in signals traveling from the input source to the signal processor (e.g., input signal received by the signal processor) caused by electrical stimuli emitted from the stimulator. Electrical interference can be caused by, for example, electromagnetic induction, electrostatic coupling, or conduction. Such interference or other noise can obscure details in the input signal and can degrade the signal-to-noise ratio of the input signal. The degraded signal-to-noise ratio can impact the ability of a wearer to hear, interpret, and/or understand the acoustic stimulation (e.g., sound) represented by the input signal, which can manifest as a wearer unable to understand speech. In some embodiments, the input source is configured to modify the signal provided by the sensor prior to outputting to the signal processor, as shown via signal modification 820, to improve the signal-to-noise ratio of the input signal received by the signal processor.

Figure 8B:
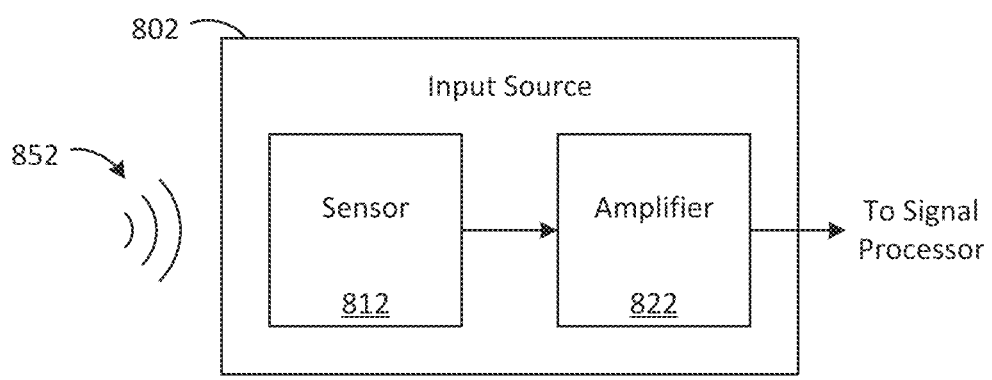
FIG. 8B is a schematic diagram illustrating an alternative input source and its various components.

Various types of signal modification can be performed on the signal provided by the sensor to improve the signal-to-noise ratio of the input signal received by the signal processor. For example, in the embodiment of FIG. 8B, the input source 800 includes an amplifier 822 which can receive signals from the sensor 812 and generate amplified signals. The amplifier 822 can be any type of amplifier, for instance, in various examples, the amplifier 822 can be a transistor amplifier, an operational amplifier, or other type of amplifier for amplifying signals. In various examples, amplifier 822 can be configured to provide any amount of gain.

In some embodiments, the amplifier 822 can be an amplifier with an adjustable transfer function, whereby amplification of a signal can be adjusted and is dependent on the transfer function. In some such embodiments, the transfer function can be programmable, for example, wherein the gain of the amplifier can be adjusted. In some examples, a gain profile of the amplifier can be adjusted, for instance, gain values associated with different frequencies or frequency ranges. In operation, the amplifier 822 can amplify signals received from the sensor 812, which are representative of acoustic stimuli 852. The amplified signals can then be output to the signal processor for further processing. Such amplified signals can be less susceptible to noise and can have a better signal-to-noise ratio than non-amplified signals, for example, if the amplitude of the amplified signal is much larger than the amplitude of the noise, such as interference from electrical stimuli picked up via a lead connecting the input source 802 and a signal processor. In some embodiments, an amplifier is used in addition to other signal modification.

Figure 8C:
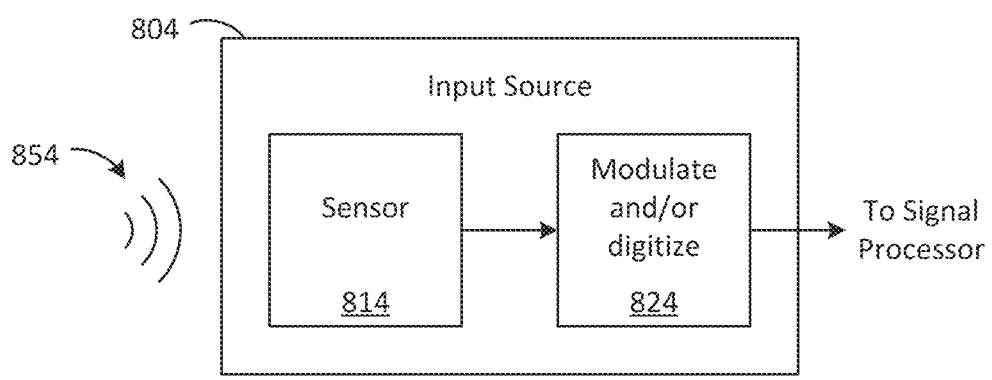
FIG. 8C is a schematic diagram illustrating an alternative input source and its various components.

Other types of signal modification can be performed on signals provided by the sensor in addition or as an alternative to signal amplification. In the embodiment of FIG. 8C, for instance, the input source 804 includes a modulator and/or digitizer 824. The modulator and/or digitizer 824 can comprise circuitry (e.g., modulation circuit) which can modulate and/or digitize the signal provided by the sensor 814 before it is output to the signal processor. For example, the modulator and/or digitizer 824 can modulate the signal generated by the sensor 814 such that the frequency of the signal is mixed with a higher frequency signal to produce a modulated signal. In some embodiments, the modulated signal has a frequency between 100 kHz and 1 GHz.

In some embodiments, the frequency of the modulated signal can depend on the type of modulation used and the precision of the signal to be represented. For example, in pulse density modulation, the frequency of the modulated signal can be set high enough so that parts of the modulated signal are not filtered out, for example, in the signal processor, before demodulating the signal. In some embodiments, the larger the difference between the frequency of the modulated signal and the frequency of any noise in the system, the easier it can be to filter the noise from the modulated signal, for example, in the signal processor.

For instance, in the illustrated example of FIG. 8C, the signal processor can receive the modulated signal from the input source 804. In some embodiments, to recover the original signal generated by the sensor 814, the signal processor can be configured to demodulate the modulated signal. By modulating the signal, the signal-to-noise ratio can be improved as noise in the system can be more effectively removed (e.g., filtered). For example, if some noise in the system has a frequency at 1 kHz and the signal from sensor 814 is modulated to have a carrier frequency of 1 MHz, the system (e.g., via the signal processor) can filter out signals above and below 1 MHz such that the 1 kHz noise is effectively removed prior to demodulating the signal. In some embodiments, modulation can be used in addition to other signal modification, such as amplification.

The modulator and/or digitizer 824 can additionally or alternatively digitize the signal provided by the sensor 814. For example, the modulator and/or digitizer 824 can convert the signal provided by the sensor from analog to digital using pulse-code modulation or pulse-density modulation. In pulse-density modulation, for example, the density of pulses determines the analog signal of interest. Using pulse-code modulation or pulse density modulation, the analog signal of sensor 814 can be encoded into a digital signal which is sent to the signal processor. In some embodiments, to recover the original signal generated by the sensor 814, if using pulse-density modulation, the signal processor can filter the digital signal (e.g., via a low pass filter). However, in some embodiments, the digital signal is used directly by the signal processor as the digital signal is representative of the analog signal. In some embodiments, interference from electrical stimulation, which can be introduced between the input source 804 and the signal processor, can be less likely to affect a digital signal sent to the signal processor than an analog signal sent to the processor. Further, the digital signal can be subject to error correction (e.g., within the signal processor) which can correct possible errors caused by interference. Thus, by sending a digital signal across the wire from the input source 804 to the signal processor, the signal-to-noise ratio of the signal received by the signal processor can be decreased. In some embodiments, modulation can be used in addition to other signal modification.

Accordingly, in some embodiments, generating an input signal for the signal processor comprises receiving an acoustic stimulus via a sensor and modifying an output of the sensor. However, in some cases, modifying the signal generated from the sensor to generate an input signal requires electrical power in order to operate one or more components configured to modify the signal, such as an amplifier and/or a modulation circuit. In some such embodiments, power and ground are provided to the input source to enable signal modification.

Figure 9A:
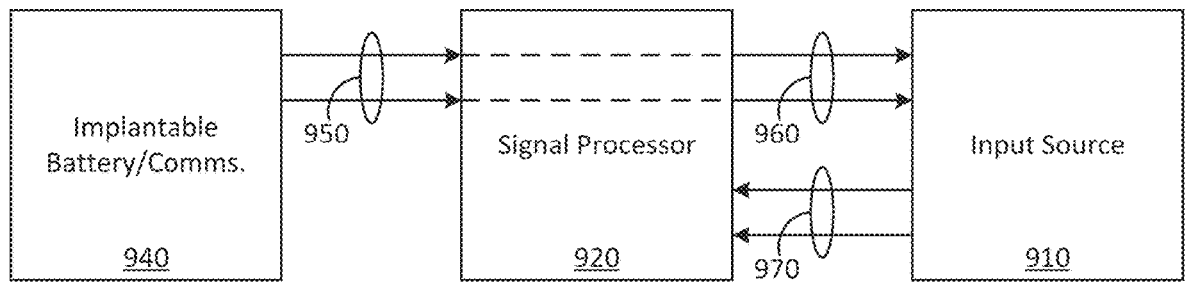
FIG. 9A is a high-level schematic diagram illustrating an exemplary communication configuration between an implantable battery and/or communication module, a signal processor, and an input source.
Figure 9B:
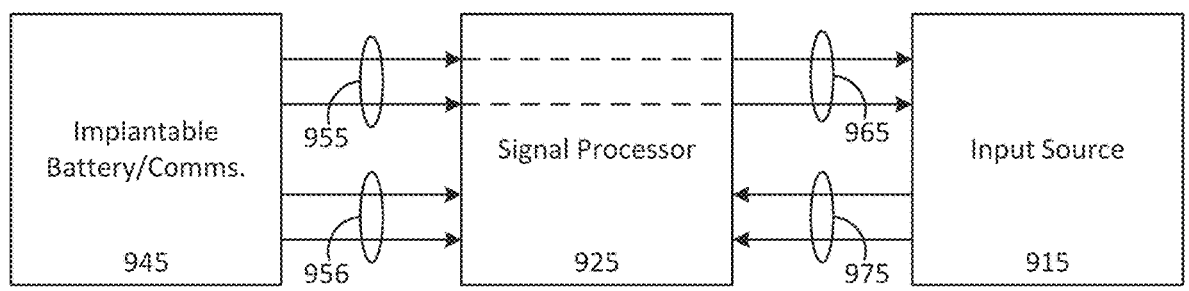
FIG. 9B is a high-level schematic diagram illustrating an alternative exemplary communication configuration between an implantable battery and/or communication module, a signal processor, and an input source.

FIGS. 9A and 9B show example configurations of providing electrical power to input source. FIG. 9A shows a high-level schematic diagram illustrating an exemplary communication configuration between an implantable battery and/or communication module 940, a signal processor 920, and an input source 910. In the example of FIG. 9A, the implantable battery and/or communication module 940 is in communication with the signal processor 920. For instance, the implantable battery and/or communication module 940 can communicate power and/or data signals 950 to the signal processor 920. In the example of FIG. 9A, the power and data signals 950 can be included in a single signal generated in the implantable battery and/or communication module 940 and transmitted to the signal processor 920. Such signals can include, for example, a digital signal transmitted with a particular clock rate, which in some embodiments, can be adjustable, for example, via the implantable battery and/or communication module 940.

In some embodiments, similar communication can be implemented between the signal processor 920 and the input source 910, wherein the signal processor 920 provides power and data to the input source 910 (e.g., 960) and receives data in return from the input source 910 (e.g., 970). For example, the signal processor 920 can be configured to output signals (e.g., power and/or data) to the input source 910 via a similar communication protocol as implemented between the implantable battery and/or communication module 940 and the signal processor 920 such as described elsewhere herein. The input source 910 can be configured to provide signals to the signal processor, for example, representative of acoustic stimuli generated by a sensor of the input source 910.

Similar to as shown and described with respect to FIG. 6B, in some embodiments, the implantable battery and/or communication module 940 provides power and/or data to the signal processor 920 via signals and inverted signals (e.g., 950). The opposite nature of the signals output to the signal processor 920 can result in a charge-neutral communication between the implantable battery and/or communication module 940 and the signal processor 920, such that no net charge flows through the wearer. As described elsewhere herein, in some embodiments, signal processor 920 can extract signals and power from signals 950 provided from the implantable battery and/or communication module 940.

In some embodiments, the signal processor 920 can provide electrical power to the input source 910, as shown via signals 960. In some embodiments, the signals 960 include a signal and its inverse such that communication from the signal processor 920 to the input source 910 is charge neutral. In some embodiments, the signals 960 provided from the signal processor 920 to the input source 910 are the same as signals 950 provided from the implantable battery and/or communication module 940 to the signal processor 920. For example, in some examples, the signal processor 920 is wired or otherwise programmed such that it passes signals received from implantable battery and/or communication module 940 (e.g., signals 950) to the input source 910.

For instance, in some embodiments, the input source 910 is in communication with the implantable battery and/or communication module 940 in parallel with the signal processor 920 such that the input source 910 receives the same signals from the implantable battery and/or communication module 940 (e.g., power signals) as the signal processor 920. In some examples, such parallel communication is provided via internal circuitry of the signal processor 920, for example, wherein one lead connects implantable battery and/or communication module 940 and signal processor 920 and provides signals 950 to signal processor 920 and another lead connects signal processor 920 to the input source 910 and passes signals 950 thereto. In other examples, implantable battery and/or communication module 940 directly communicates with signal processor 920 via a first lead and with the input source 910 via a second lead.

In some embodiments in which the signal processor 920 and input source 910 are in parallel communication with the implantable battery and/or communication module 940, the signal processor 920 can extract DC power from signals provided by the implantable battery and/or communication module 940. In some such examples, the input source 910 can similarly extract DC power from the signals sent by the implantable battery and/or communication module 940. For example, in some embodiments, input source 910 can include a rectifier circuit to extract DC power from a signal and its inverse sent by the implantable battery and/or communications module 940 to the input source 910. In various examples, such rectifier circuit can comprise any known appropriate circuitry components for rectifying one or more input signals.

While the signal and inverse signal sent from the implantable battery and/or communication module 940 to the input source 910 can include data encoded into the signals, in some embodiments, the input source 910 can disregard the encoded data and can use the signal and the inverse signal to power one or more components within the input source 910. For example, the input source 910 can use the extracted power from the signal and the inverse signal to power an amplifier as in FIG. 8B.

As shown in FIG. 9A, the input source 910 can receive power (e.g., 960) from the signal processor 920 and can send data such as an input signal (e.g., 970) back to the signal processor 920. In some embodiments, the communication of the input signal to the signal processor 920 can include sending a digital input signal and its inverse signal to maintain charge balance through a wearer's body. However, in some embodiments, the communication of the data to the signal processor 920 can include sending an analog signal and its inverse signal to maintain charge balance as the signal is sent through a wearer body. The data communication between the input source 910 and the signal processor 920 can include two wires to send the communication signals, for example, to send a signal and its inverse signal. In some cases, such communication can be similar to that shown in FIG. 6B, 7B, or 7C. Input source 910 and signal processor 920 can be AC-coupled, for instance, via capacitors.

FIG. 9B shows an alternative high-level schematic diagram illustrating an exemplary communication configuration between an implantable battery and/or communication module 945, a signal processor 925, and an input source 915. In the example of FIG. 9B, the implantable battery and/or communication module 945 can be configured to provides signals (e.g., 955, 956) to the signal processor 925. For example, in some embodiments, the implantable battery and/or communication module 945 can separately output power signals (e.g., 955) and data signals (e.g., 956) to the signal processor. As shown and described with respect to FIGS. 7A-7D, the implantable battery and/or communication module 945 can include a power signal generator and a separate signal generator. In some such embodiments, the power signal generator can generate and output power signals (e.g., 955) and the signal generator can generate and output data signals (e.g., 956). As discussed elsewhere herein, having separate signal generators for power and data signals can increase the transfer efficiency of the power and data signals. In some embodiments, the implantable battery and/or communication module 945 sends power signals and data signals through the signal processor 925 to the input source 915. However, in some embodiments, the implantable battery and/or communication module 945 sends power signals and data signals to the signal processor 925 with only the power signals traveling through or otherwise being communicated to the input source 915.

In some embodiments, the input source 915 can be in communication with the implantable battery and/or communication module 945 in parallel with the power signals provided to the signal processor 925. In some such embodiments, the input source 915 can receive power signals (e.g., 965) from the implantable battery and/or communication module 945 without the power signals first traveling through the signal processor 925 (e.g., via separate leads connecting the implantable battery and/or communication module 945 to the signal processor 925 and input source 915). In other examples, similar to described with respect to FIG. 9A, the signal processor 925 can configured to receive signals 955 via a first lead and output such signals to the input source 915 via a second lead. Accordingly, in some embodiments, signals 965 provided to input source 915 are the same as signals 955 output from the implantable battery and/or communication module 945. In various examples, such signals can be received from the signal processor 925 or directly from the implantable battery and/or communication module 945. Such signals can be communicated as a signal and its inverse (e.g., as described with respect to FIG. 7B) to provide charge-neutral power to the input source 915, which can be configured to extract DC power via, for example, a rectifier circuit as described herein.

In an example operation of FIG. 9B, the implantable battery and/or communication module 945 can output data signals (e.g., 956) to the signal processor 925 and can output power signals (e.g., 955, 965) to both the signal processor 925 and the input source 915. The signal processor 925 and the input source 915 can thus receive power to perform their various functions. For example, the input source 915 can receive power signals (e.g., 965) and can provide an input signal (e.g., 975), to the signal processor 925. By providing power to the input source 915, the input source 915 can perform functions it would not otherwise be able to perform without power. For example, in some embodiments, input source 915 is not able to amplify signals it generates from received acoustic stimuli without electrical power. However, as discussed elsewhere herein, in some embodiments, the input source can use electrical power from the received power signals (e.g., 965) to generate an amplified, modulated, and/or digitized signal representative of received acoustic stimuli.

While in some example operations of FIG. 9B, power and data signals are generated and output separately by the implantable battery and/or communication module 945, in some embodiments, the power and data signals are generated and output together. For example, as described with respect to FIG. 7B, should a signal generator of the implantable battery and/or communication module 945 fail, data for communication from the implantable battery and/or communication module 945 can be encoded into the power signals. In such embodiments, power and data can be combined into a signal which is output to both the signal processor 925 and the input source 915. As similarly described with respect to FIG. 9A, the input source 915 can disregard the encoded data of the signal and use the signal to obtain DC power for one or more components (e.g., amplifier, digitizer and/or modulator). With power delivered to the input source 915 from the implantable battery and/or communication module 945, the input source 915 can modify received signals to improve their signal-to-noise ratio and output the modified signals to the signal processor 925.

Electrical communication techniques described herein, for example, with respect to FIGS. 6B, 7B, and 7C, wherein a signal and its inverse are communicated together to facilitate charge-neutral communication, can be used to provide electrical power to the input source to power one or more components for improving the signal-to-noise ratio of an input signal. As described, in some embodiments, the signal and corresponding inverted signal provided to the input source are the same as a signal and inverted signal provided to the signal processor, such as via parallel communication with the signal processor.

In addition to or alternatively to modifying signals generated by a sensor of the input source, other techniques can be used to improve the signal-to-noise ratio of the input signal which is received by the signal processor. For example, in some embodiments, interference is created by electrical stimulation output to an electrode by a stimulator.

Figure 10:
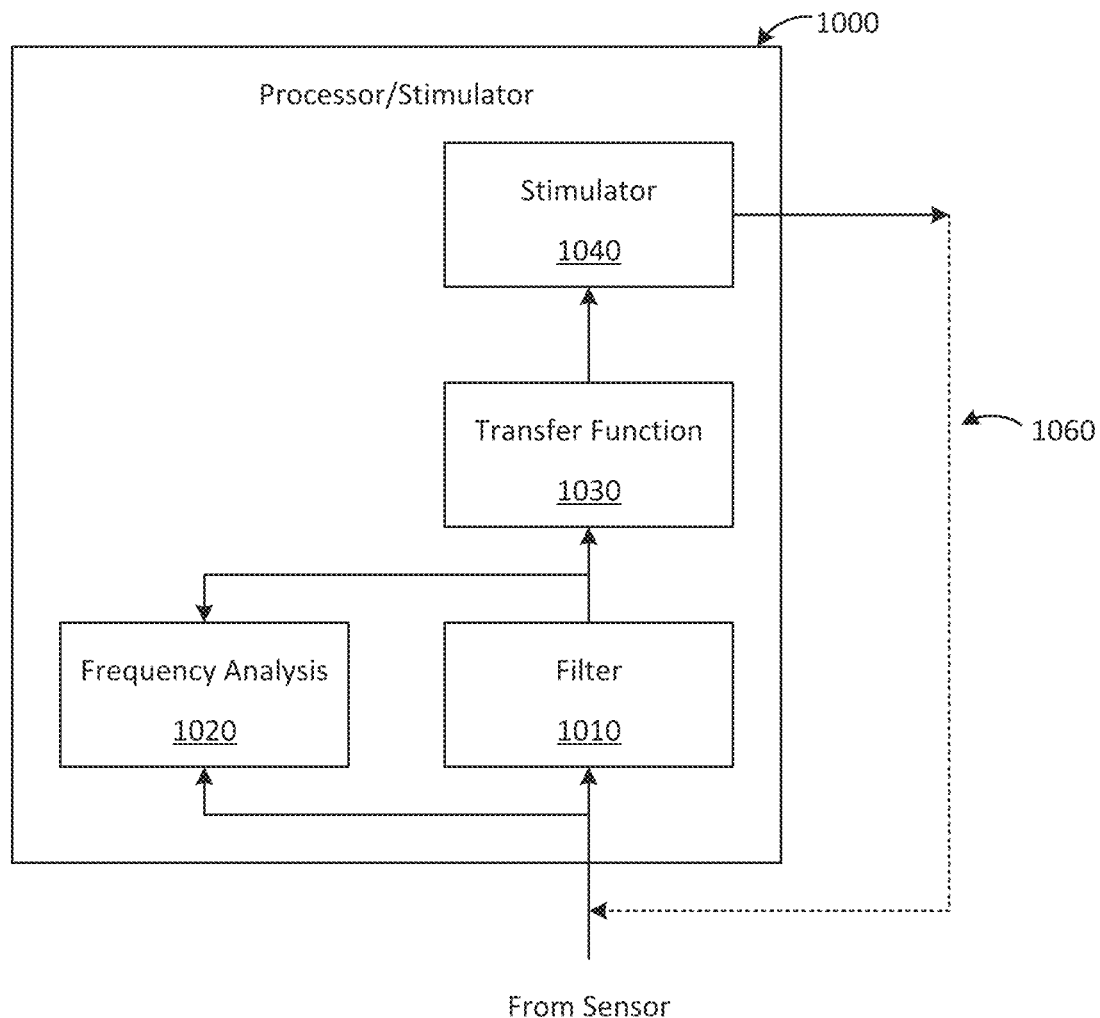
FIG. 10 is a block diagram illustrating an example source of interference from a combination processor and stimulator.

FIG. 10 is a block diagram illustrating an example source of interference from a combination processor and stimulator. In FIG. 10, a processor/stimulator 1000 can receive an input signal from an input source and can output an electrical stimulus to an electrode which can stimulate a wearer's cochlear tissue in response to the received input signal. In the illustrated example, the processor/stimulator 1000 includes a stimulator 1040 configured to provide electrical stimulation to a cochlear electrode 1050. The sensor can be in communication with the processor/stimulator 1000 via one or more wires (e.g., lead) through a wearer's body with the input signal traveling through the wire(s) to the processor/stimulator 1000.

As discussed elsewhere herein, the stimulator 1040 can be in communication with a cochlear electrode 1050 having one or more contact electrodes configured to provide electrical stimulation to a wearer's cochlear tissue based on electrical stimuli from the stimulator 1040. In some embodiments, the processor/stimulator 1000 is configured to deliver electrical stimulation in the form of pulses (e.g., current pulses) at a constant pulse rate.

The stimulator 1040 can include multiple stimulation channels from which to output electrical stimuli to corresponding contact electrodes. The stimulation channels can, in some examples, correspond to multiple wires connecting to multiple contact electrodes. In operation, the stimulator 1040 can deliver electrical stimulation in the form of current pulses via the contact electrodes to a wearer's cochlear tissue at a pulse rate. The pulse rate can be within any range of rates but in some embodiments is between 100-100,000 pulses per second, and in some embodiments, is between 100-100,000 pulses per second per stimulation channel. The pulse rate can be the same across multiple stimulation channels. An audiologist can determine a recommended pulse rate for the stimulator. In some examples, a faster pulse rate can correspond to better representation of higher frequencies in audio signals.

As shown in the example of FIG. 10, in some embodiments the sensor can pick up a portion of the electrical stimulation emitted from the cochlear electrode 1050, thereby introducing interference to the input signal generated by the sensor. Additionally or alternatively, some embodiments, the connection between the sensor and the processor/stimulator 1000 (e.g., a lead) can pick up a portion of the electrical stimulation (e.g., as shown by 1060), introducing interference to the input signal as it is communicated to the processor/stimulator 1000. In some embodiments, the stimulation can be picked up by both the sensor and a lead connecting the sensor to the processor/stimulator 1000 and introduce interference into the input signal received by the processor/stimulator 1000.

In some embodiments, the processor/stimulator 1000 can be further configured to filter the received input signal based on the pulse rate such that one or more frequencies associated with the pulse rate in the received input are attenuated. The processor/stimulator 1000 can also be configured to provide a stimulation signal to the stimulator 1040 based on the filtered input signal. By outputting electrical stimuli at a constant pulse rate and filtering one or more corresponding frequencies before the input signal is used to generate the stimulation signal, interference from the electrical stimuli emitted from the stimulator 1040 and cochlear electrode 1050 and picked up at the input from the sensor can be attenuated.

As described elsewhere herein, a signal processor can be programmed with a transfer function relating a received input signal and a resulting stimulation signal output to a stimulator. In the illustrated example, processor/stimulator 1000 includes a transfer function 1030 and a filter 1010 prior to the transfer function. Thus, in some embodiments, an input signal from an input source can be filtered at filter 1010 prior to the applying the transfer function 1030 to generate a corresponding stimulation signal for stimulator 1040.

As illustrated in FIG. 10, the input signal from the sensor can pass through a filter 1010 before going to the transfer function 1030 and the stimulator 1040. In various examples, filter 1010 can include an analog filter and/or a digital filter. For instance, in some embodiments, the input signal is converted from an analog signal to a digital signal before being filtered by filter 1010. In some such embodiments, the analog input signal can be sampled using the processor/stimulator 1000. Alternatively, in some embodiments, the input signal can be converted from a digital signal to an analog signal before being filtered by filter 1010. Converting the input signal can allow different sensors and different filters to be used.

The filter 1010 can be an analog or digital filter and can be any type of filter that can be used to attenuate signals at a predetermined frequency or range of frequencies. In some embodiments, the filter comprises an analog filter which can be tuned by the processor/stimulator 1000 to attenuate a frequency or range of frequencies corresponding to the pulse rate of stimulation. In some embodiments, the filter comprises a digital band-stop filter (e.g., notch filter) with a quality (Q) factor. In some embodiments, the filter 1010 can have an adjustable Q factor. By using a band-stop filter, the filter can attenuate a range of frequencies in the input signal which are undesirable. While a single filter is described, the filter 1010 can comprise one or more filters to filter signals.

In some embodiments, the filter 1010 comprises a parametric equalizer, which can include one or more tunable parameters to adjust the filtering of signals, such as the Q factor and/or gain. The parametric equalizer can increase and/or decrease the gain of different frequencies and can, for example, filter out a certain range of frequencies using the tunable parameters. In some embodiments, the processor/ stimulator 1000 can adjust the tunable parameters of the parametric equalizer, however in some embodiments, an audiologist can adjust the tunable parameters.

In some embodiments, the signal processor is configured to adjust one or more filter parameters in response to a generalized input, such as a "filter strength adjustment." In some such examples, an audiologist can adjust the "filter strength" in order to reduce noise, such as interference caused by electrical stimulation. The signal processor can be configured to adjust one or more parameters, such as a range of frequencies being filtered and/or an attenuation profile (e.g., across one or more frequencies) based on the adjusted "filter strength." This can simplify operation from an audiologist perspective while the signal processor can make more complicated adjustments to the filtering profile.

In some embodiments, the range of frequencies can comprise any range between 10 Hz and 20 kHz. In some embodiments, the filter filters the input signal based on the pulse rate of the electrical stimuli output by the stimulator 1040. For example, the filter 1010 can attenuate a range of frequencies that include a frequency corresponding to the pulse rate of the electrical stimuli output from stimulator 1040. In some embodiments, the filter 1010 attenuates the single frequency corresponding to the pulse rate of the electrical stimuli output from stimulator 1040. For instance, in an example embodiment, the stimulator is configured to output electrical stimuli at a pulse rate of 1000 pulses per second. The processor/stimulator 1000 can be configured to configure filter 1010 to attenuate signals having a frequency of 1 kHz or a range of frequencies including 1 kHz. In some embodiments, the filter 1010 can be configured to filter additional frequencies or ranges of frequencies, for example, including one or more harmonics associated with the stimulation rate. In some embodiments, the processor/stimulator 1000 is configured to determine one or more harmonics to filter based on a digital sampling rate, such as of the processor/stimulator 1000. For instance, in some examples, if the processor/stimulator 1000 samples an analog input signal at 20 kHz, the highest frequency signal that can be reproduced is approximately 10 kHz. Thus, in some such examples, the filter 1010 need not attenuate frequencies above 10 kHz, since such signals will not be reproduced within the sampled input signal in the first place.

Once the input signal has been filtered by the filter 1010, in some embodiments, the filtered signal can be further processed by the processor/stimulator 1000 (e.g., via transfer function 1030) as is described elsewhere herein to generate a stimulation signal. The resulting stimulation signal can then be used by the stimulator 1040 to generate electrical stimuli.

In some examples, the processor/stimulator 1000 is configured to analyze the frequency content of one or more signals, such as a received input signal from a sensor and/or the result of filtering the received input signal, shown at frequency analysis 1020.

While shown as being embodied in a processor/stimulator 1000 in FIG. 10, in some embodiments, functions described with respect thereto in FIG. 10 can be performed by a standalone signal processor. For instance, as described elsewhere herein, in some embodiments, a signal processor can be configured to receive an input signal from an input source and output a stimulation signal to a stimulator, wherein the signal processor and stimulator are separate components connected by a lead (e.g., 180 in FIG. 1). Accordingly, in some embodiments, a standalone signal processor can be configured to receive an input signal, filter the signal to attenuate one or more frequencies associated with electrical stimulation from the stimulator, and generate a stimulation signal to send to the stimulator based on the filtered input signal and a transfer function. The signal processor can be configured to analyze the frequency content of the incoming input signal and/or the result of the filtering (e.g., as shown by frequency analysis 1020 in FIG. 10).

In some examples, the signal processor (or signal processor functionality within the processor/stimulator) provides stimulation signals to the stimulator such that signal processor and stimulator operate with respect to the same clocking rate or time reference. Accordingly, the frequency content of interference caused by electrical stimuli emitted from the stimulator can be predicted precisely by the signal processor. Thus, the signal processor (e.g., a standalone signal processor or within a combined stimulator/processor) can be configured to adjust operation of the filter 1010 to narrowly attenuate frequencies susceptible to interference from the pulsed stimulation. In some such examples, the narrow attenuation can leave other frequencies unaffected by the filter 1010 such that the signal fidelity is otherwise maintained, and stimulation applied to the wearer is not negatively impacted by the filtering.

Figure 11:
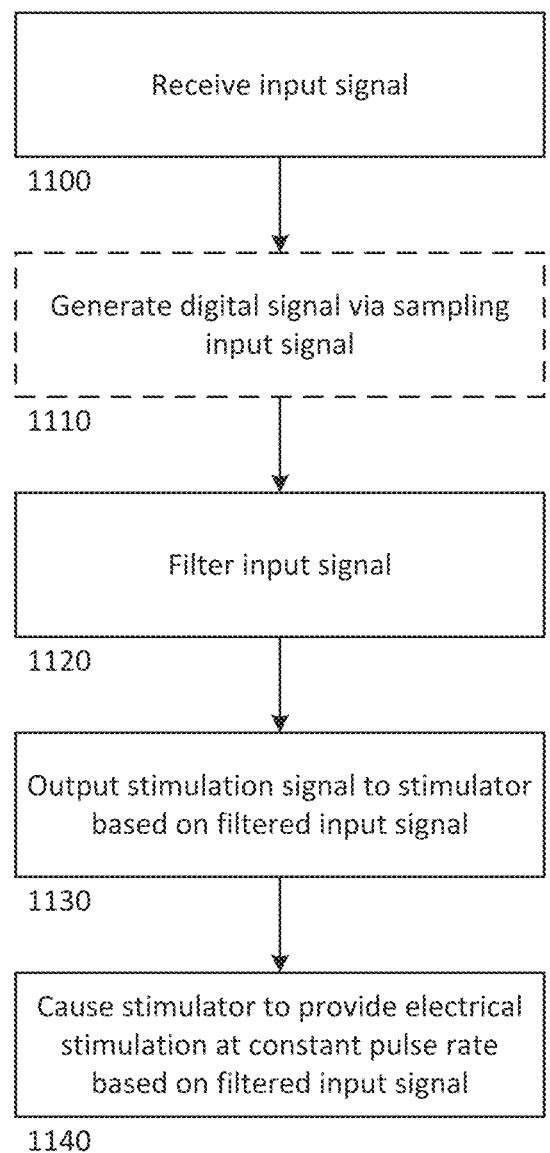
FIG. 11 is a flow diagram of an example operation of a signal processor to decrease noise in an input signal caused by interference from electrical stimulation.

FIG. 11 is a flow diagram of an example operation of a signal processor (e.g., a standalone signal processor or a combination processor/stimulator 1000) to decrease noise in an input signal caused by interference from electrical stimulation. The signal processor can be configured to receive an input signal, such as from an input source, at step 1100. In some embodiments, the input signal is an analog input signal and can be converted to a digital signal via sampling of the input signal in step 1110. For example, the signal processor can be configured to sample the input signal, which can be an analog signal, at a sample rate between 16,000-24,000 samples per second. Sampling at a higher rate can enable the signal processor to reproduce higher frequencies.

In the example of FIG. 11, the signal processor can further be configured to filter the input signal in step 1120. The signal processor can comprise one or more filters to filter the input signal. In some embodiments, filtering the input signal can comprise applying one or more band-stop filters that attenuate a range of frequencies. In some examples, the range of frequencies is associated with a stimulation pulse rate. For instance, in some examples, the range of frequencies includes a pulse rate frequency (e.g., the range of frequencies includes 1000 Hz when the pulse rate is 1000 pulses per second). Additionally or alternatively, filtering the input signal can include applying attenuating one or more individual frequencies (e.g., a pulse rate frequency and/or harmonics thereof).

In step 1130, the signal processor can further be configured to output a stimulation signal (e.g., to a stimulator) based on the filtered input signal. As discussed elsewhere herein, the stimulation signal can cause the stimulator to provide electrical stimulation at a constant pulse rate based on the filtered input signal. For instance, in some embodiments, the stimulation signal is based on a transfer function applied to the filtered input signal. By causing the stimulator to provide electrical stimulation at a constant pulse rate, the signal processor can be configured to specifically filter out frequencies associated with the constant pulse rate. Filtering out such frequencies can reduce the interference in the input signal from the electrical stimulation and increase the signal-to-noise ratio of the input signal.

While the signal processor can filter the input signal to reduce interference associated with stimulation, it can be advantageous to determine if interference is present in the input signal such that filtering would improve the signal-tonoise ratio, as filtering the input signal can be computationally expensive. For example, if no interference is present in the input signal, filtering the input signal may not improve the input signal and can increase resource costs. Thus, in some embodiments, the signal processor can be configured to perform analysis of the input signal to determine if filtering is required or desirable.

Figure 12:
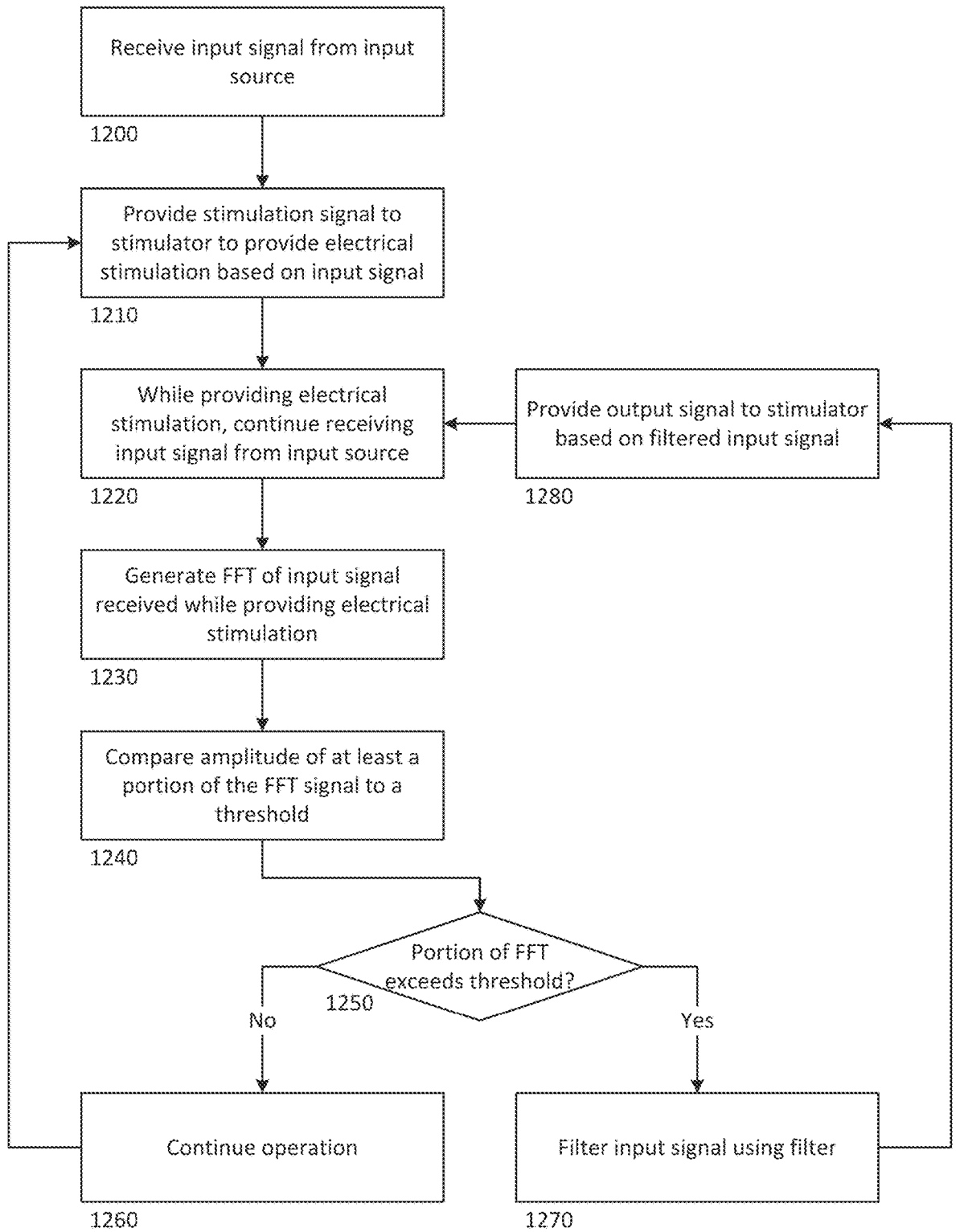
FIG. 12 is a flow diagram of an example operation of a signal processor to decrease noise due to interference from electrical stimulation in an input signal.

FIG. 12 is a flow diagram of an example operation of a signal processor to decrease noise due to interference from electrical stimulation in an input signal. As discussed elsewhere herein, a signal processor can be configured to receive an input signal from an input source as in step 1200 and can further be configured to output a stimulation signal to a stimulator such that the stimulator provides electrical stimulation based on input signal as in step 1210. The signal processor, while providing electrical stimulation, can continue receiving an input signal from the input source as in step 1220. In some embodiments, the signal processor can be further configured to perform frequency analysis of the received input signal.

In some such embodiments, the signal processor performs frequency analysis of the input signal by generating a Fast Fourier Transform (FFT) of the input signal that was received while electrical stimulation was being applied, as in step 1230. Generating an FFT of the input signal can transform the input signal into its constituent frequencies. In some embodiments, the FFT of the input signal can be considered a transformed input signal.

In some embodiments, the signal processor can use the signal analysis of the input signal (e.g., the FFT of the input signal) to determine if filtering of the input signal is necessary or desirable. For example, in FIG. 12 at step 1240, the signal processor can be configured to compare the amplitude of at least a portion of the FFT signal to a threshold. In some embodiments, the portion of the FFT signal corresponds to a single frequency. For example, the signal processor can be configured to compare the amplitude of a frequency corresponding to a stimulation pulse rate to a threshold. However, in some embodiments, the portion of the FFT signal corresponds to a range of frequencies, such as a frequency bin within the FFT signal. For example, the signal processor can be configured to compare the amplitude of a 100 Hz frequency range centered about the frequency corresponding to the stimulation pulse rate to a threshold.

Continuing with step 1250, if the amplitude of the at least a portion of the FFT does not exceed the threshold, the operation of the signal processor can continue operation, as in step 1260, and continue with step 1210 by providing a stimulation signal to the stimulator based on the received input signal. However, if the amplitude of the at least a portion of the FFT exceeds the threshold, the operation of the signal processor can continue with step 1270.

The threshold can be any threshold. In some examples, the threshold is indicative of whether interference is present in the input signal from electrical stimulation by the stimulator. The threshold can be an absolute threshold or a relative threshold. For instance, in some examples, the threshold can include comparing the magnitude of the portion of the FFT signal to a maximum or average amount magnitude of the FFT signal across a plurality of frequency bins. In some embodiments, the threshold can be the threshold at which the portion of the FFT would be perceived by the user. In some such embodiments, the threshold at which a user can perceive a signal can change due to different acoustic environments, for example.

In step 1270, the signal processor is configured to filter the input signal using a filter, such as a band-stop filter. In some embodiments, the signal processor is configured to filter the frequencies associated with the portion of the FFT signal that exceed the threshold in step 1250. As discussed elsewhere herein, the filter can attenuate frequencies which are associated with the pulse rate of electrical stimulation (e.g., stimulation in step 1210) which can decrease the interference in the input signal caused by the electrical stimulation. Further, in step 1280, the signal processor can be configured to provide an output signal to the stimulator based on the filtered input signal and the process can continue with step 1220.

In configurations such as in FIG. 12, the signal processor can continually analyze the input signal from the input source to determine if filtering of the input signal is necessary. For example, the signal processor can initially determine that filtering of the input signal is desirable for a better signal, but can later determine that filtering of the input signal is no longer worth the computational resources due to various factors, such as minimal signal-to-noise improvement due to a low level of detected signal interference (e.g., below the threshold of step 1250).

In some embodiments, the signal processor can analyze the input signal at regular intervals to determine if filtering is desirable. This can allow the processor to filter the signal only when a benefit is gained by doing so, and does not use computation resources associated with filtering when any detected interference from the electrical stimulation is sufficiently low (e.g., the associated portion of the FFT is below the threshold).

In some embodiments, an audiologist can analyze the input signal from the input source to determine if filtering of the input signal is beneficial. For example, a wearer of the cochlear implant system can go into a quiet room and an audiologist can measure the impact of stimulation on the input signal to determine if filtering is beneficial.

In an example embodiment, an interference detection process can be performed in a quiet environment such that any input signal received by the signal processor is due to noise, such as from stimulation interference. In such an example, a wearer can be placed in a quiet environment or other prevented from receiving acoustic stimuli at an input source (e.g., via headphones, etc.), and the signal processor can be configured to cause the stimulator to output an electrical stimulus and analyze input signals received from the input source. Such signals, if the input source is prevented from receiving acoustic stimuli, are likely due to noise, such as interference from the stimulation. The signal processor can determine an amount of interference caused by the stimulation.

In some such examples, a process similar to that shown in FIG. 12 can be performed, but wherein comparing the portion of the FFT to a threshold comprises determining whether the portion of the FFT is sufficiently high that interference will likely be imperceptible or tolerable. For instance, in an example, if the magnitude of the portion of the FFT is sufficiently high, filtering can be disabled because the amount of interference is small relative to the overall magnitude of input signal in that frequency range. In a similar process, the signal processor can be configured to initiate filtering if the portion of the FFT is sufficiently small that the interference is likely to be perceptible to the wearer.

Figure 13:
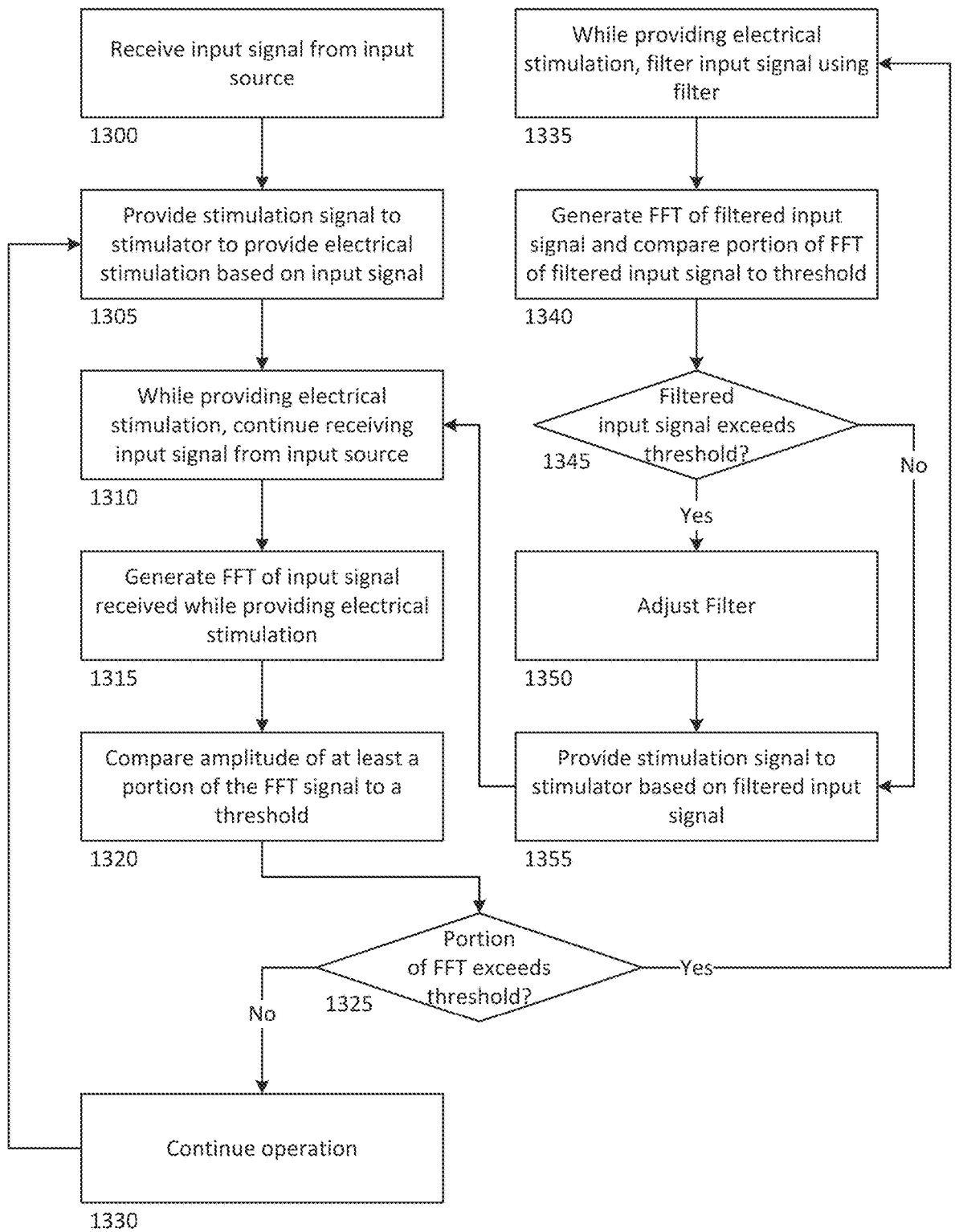
FIG. 13 is a flow diagram of an alternative example operation of a signal processor to decrease noise due to interference from electrical stimulation in an input signal.

As discussed elsewhere herein, in some embodiments, one or more filter parameters can be adjusted. An example operation of a signal processor is illustrated in FIG. 13 which incorporates an adjustable filter. FIG. 13 is a flow diagram of an alternative example operation of a signal processor to decrease noise due to interference from electrical stimulation in an input signal. Similar to FIG. 12, the signal processor can be configured to receive an input signal from an input source and provide a stimulation to a stimulator of the signal processor to provide electrical stimulation based on the received input signal as in steps 1300 and 1305. Further, while providing electrical stimulation, the signal processor can be configured to continue receiving an input signal from the input source as in step 1310. Next, in step 1315, the signal processor can generate an FFT of the received input signal while providing electrical stimulation. The signal processor can additionally compare the amplitude of at least a portion of the FFT signal to a threshold and, if the portion of the FFT does not exceed the threshold, the signal processor can continue operation, as in step 1330, such as by continuing at step 1305. However, if the portion of the FFT exceeds the threshold, the signal processor can filter the input signal using a filter as in step 1335 while providing electrical stimulation.

In step 1340, the signal processor can be further configured to generate an FFT of the filtered input signal and can compare the amplitude of a portion of the FFT of the filtered input signal to threshold. In some examples, the portion of the FFT of the filtered input signal and the associated threshold in step 1340 are the same portion of the FFT and threshold in step 1325 (e.g., a same frequency, range of frequencies, or the like).

If the portion of the FFT of the filtered input signal exceeds the threshold, the signal processor can adjust the filter as in step 1350. For example, in some embodiments, the portion of the FFT of the filtered input signal exceeds the threshold when the filter uses a first Q factor. In such embodiments, the signal processor can adjust the filter to have a lower Q factor to expand the frequency range which the filter attenuates. Other adjustments to the filter are possible, such as adjusting the roll-off and/or cutoff frequency of the filter, and the filter can be adjusted in multiple ways simultaneously. After the filter is adjusted, the signal processor can continue operation by providing a stimulation signal to the stimulator based on the filtered input signal as in step 1355. However, if the portion of the filtered input signal does not exceed the threshold, the filter is not adjusted, and operation continues with step 1355.

After the signal processor provides the stimulation signal to the stimulator, the operation of the signal processor can start again at step 1310 whereby the signal processor is configured to continue receiving an input signal from the input source while providing electrical stimulation. Thus, the signal processor can be configured to repeat the operation in FIG. 13 including determining if filtering is necessary, and if filtering is necessary, determining if the filter requires adjustment.

While the operations of FIGS. 10-13 are each illustrated as being performed sequentially, in some embodiments, steps can be performed in a different order. Further, in some embodiments, one or more steps can be performed simultaneously as other steps.

As previously discussed, the signal processor can perform various processing, including filtering, on the signals received from the input source. Further, as shown and described with respect to FIGS. 9A and 9B, power can be delivered to the input source such that it can perform signal modification, including amplification, modulation, and/or digitization, on the signal generated by the sensor. However, the power delivered to the input source can enable further processing to occur at the input source. The further processing can help distribute signal processing such that signal processor does not need to perform all signal processing. Additionally, it can be advantageous to perform processing closer to the signal generated by the sensor as noise can be limited.

Figure 14B:
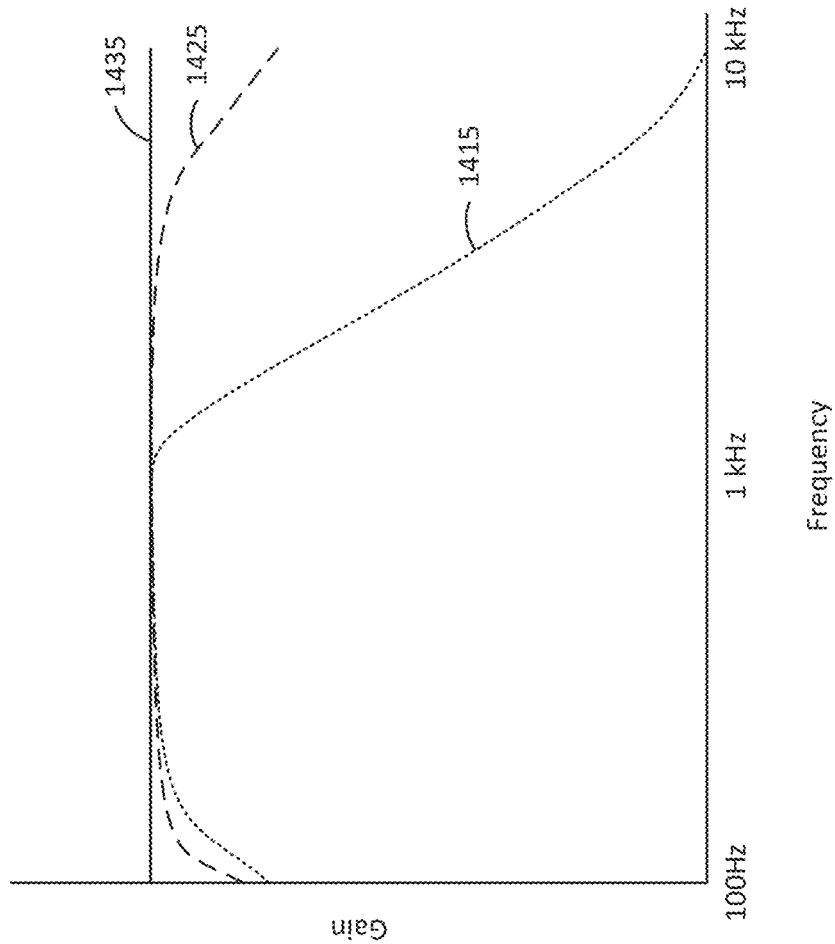
FIG. 14B shows an exemplary gain vs. frequency response curve for signals at various stages in the processing configuration of FIG. 14A.
Figure 14A:
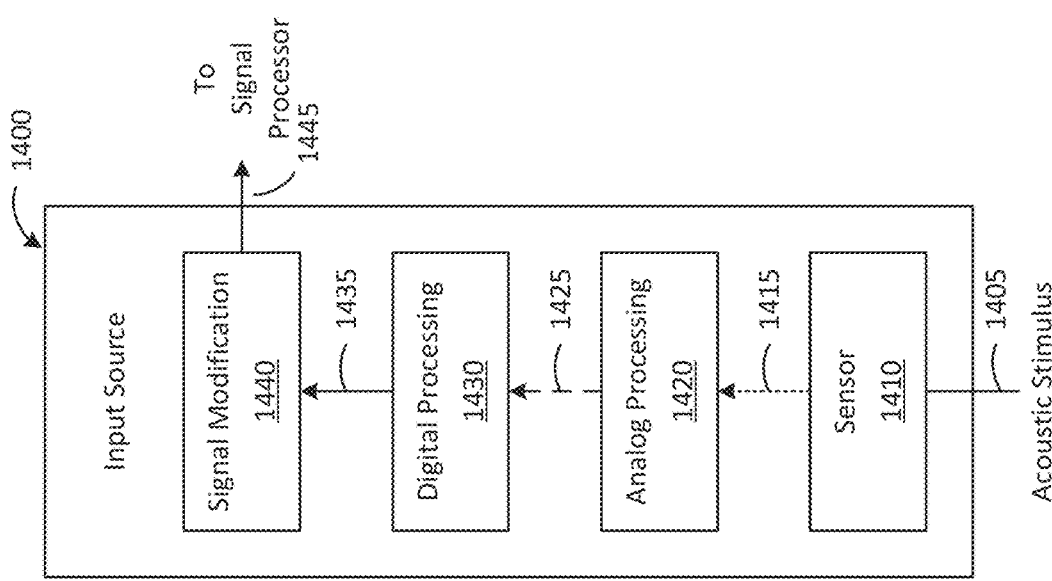
FIG. 14A is a schematic diagram showing an exemplary signal processing configuration for normalizing a stimulus signal and adapting to variability in a sensor frequency response.

FIG. 14A is a schematic diagram showing an exemplary signal processing configuration for normalizing a stimulus signal and adapting to variability in a sensor frequency response. FIG. 14B shows an exemplary gain vs. frequency response curve for signals at various stages in the processing configuration. "Gain" associated with a particular frequency, as used with respect to FIG. 14B, refers to a relationship (e.g., a ratio) between the magnitude of a signal produced by the sensor in response to an acoustic stimulus, and the magnitude of the signal at various stages of processing. In the illustrated example, the sensor 1410 of the input source 1400 receives an acoustic stimulus 1405 and generates a signal 1415 which is representative of the acoustic stimulus 1405.

As shown in FIG. 14B, the gain is very uneven over the distribution of frequencies shown in the plot. For instance, according to the illustrated example, a signal generated by the sensor 1410 at 1 kHz will result in a much larger magnitude in signal 1415 compared to a signal of the same magnitude generated by the sensor 1410 at 10 kHz. Such a discrepancy in frequency response can make signal processing difficult. Moreover, such frequency response in general may vary from person to person, or over the course of a wearer's lifetime due to physical movement of a sensor or anatomical changes.

The signal 1415 generated by the sensor 1410 undergoes analog processing 1420 to produce an analog processed signal 1425. As shown in FIG. 14B, the analog processing step 1420 improves the consistency of the gain across the range of frequencies, as the analog processed signal 1425 provides a flatter frequency response curve than does the signal 1415. In some embodiments, the analog processing can include one or more filter and/or amplifiers generally configured to flatten out the frequency response curve as shown in FIG. 14B. In some examples, the analog processing components 1420 within the input source 1400 can be substantially the same across various implantable systems in order to provide a first order correction of the frequency response. In other examples, an analog processing configuration 1420 can be customized to the wearer, for example, based on known anatomical features, measurements, analysis, or the like.

The analog processed signal 1425 undergoes a digital processing step 1430 to produce a digitally processed signal 1435. As shown in FIG. 14B, the digital processing step 1430 further improves the consistency of the gain across the range of frequencies, as the digitally processed signal 1435 provides a flatter frequency response curve than does the analog processed signal 1425. In some embodiments, the digital processing 1430 can be configured to substantially flatten the frequency response to correct remaining frequency response inconsistencies in the analog processed signal 1425. For instance, in some embodiments, after digital processing 1430, a signal of a given magnitude at a first frequency and a second frequency will result in a digitally processed signal 1435 having the same magnitude at the first and the second frequencies. Thus, the digitally processed signal 1435 corresponds to a normalized signal, reducing or eliminating the variability that comes with different wearer anatomies and wearer motion and/or changes over time. Having a normalized frequency response across large frequency ranges can simplify assessment of the efficacy of the implanted system, programming a signal processor transfer function, assessing system operation, and the like. In some examples, a flat frequency response can enable the system to present an electrical stimulus to the wearer at appropriate intensity levels, for example, with respect to received external acoustic stimuli, independent of the frequency content of the external acoustic stimuli.

In some embodiments, the digital processing 1430 can be customized via a calibration process after the system has been implanted. In an exemplary calibration process, a clinician or other user may provide a series of stimulus signals, for instance, at a plurality of frequencies and having like amplitudes, to be "picked up" by the sensor 1410, which generates a signal 1415 for each received stimulus signal. The clinician or other user may then sample the resulting analog processed signal 1425 and/or an initial digitally processed signal 1435 at the plurality of frequencies to determine the remaining non-uniformity in gain across the frequency sweep. The digital processing 1430 can be either established or updated to compensate for non-uniformities in order to establish a substantially flat frequency response curve in the digitally processed signal 1435. In some examples, a plurality of signals having different frequencies are provided in sequence and a magnitude response (e.g., gain) at each frequency is determined. After determining such a magnitude response, the digital processing stage 1430 can be updated based on the response vs. frequency relationship in order to flatten the frequency response curve.

In an alternate process, a white noise signal can be provided to be "picked up" by the sensor 1410. A transform (e.g., a Fast Fourier Transform, or FFT) of the signal can be performed in order to extract the frequency content of the signal. The extracted frequency content can used to determine a magnitude response at each frequency and the digital processing 1430 can be updated to flatten the frequency response similar to described above.

In the illustrated example of FIG. 14A, the digitally processed signal 1435 (e.g., having a uniform gain across a frequency range with respect to signals generated by the sensor) can be modified via signal modification 1440 before being sent to a signal processor. For example, as described with respect to FIGS. 8b and 8C, the digitally processed signal 1435 can be amplified and/or modulated and the resulting modified signal (e.g., 1445) can be sent to the signal processor.

In some examples, the digital processing step 1430 to provide a uniform frequency response can be incorporated into the signal modification step 1440 wherein the analog processed signal 1425 is digitally processed to both flatten the frequency response and to further modify the signal (e.g., via amplification and/or modulation).

Some features of analog and digital filtering techniques to achieve a desired gain response are described in U.S. patent application Ser. No. 16/797,392, filed Feb. 21, 2020, and entitled IMPLANTABLE COCHLEAR SYSTEM WITH INTEGRATED COMPONENTS AND LEAD CHARACTERIZATION, which is assigned to the assignee of the instant application and is incorporated herein by reference.

While shown in FIG. 14B as achieving an approximately flat gain curve, in some embodiments, analog 1420 and digital 1430 processing stages can be used to achieve any desired gain profile. For example, in some embodiments, the gain profile can be set to be flat across one or more frequency ranges, but can be adjusted to be higher or lower for other frequency ranges. In an example embodiment, the gain profile can be customized such that gain for frequencies between 1 kHz and 4 kHz is higher than for other frequencies. In general, the gain profile can be customized to match any desired gain profile.

As illustrated in FIG. 14A, the input source can comprise analog processing 1420, digital processing 1430, and signal modification 1440. While in some embodiments processing and modification of signals generated by the sensor can be static, it can be advantageous to adjust the processing and modification to account for various changes in the system (e.g., varying frequency response of the sensor over time). In some embodiments, the input source needs to receive data to adjust the signal processing and/or signal modification. Accordingly, in some embodiments, the input source receives signals from the signal processor.

Figure 15A:
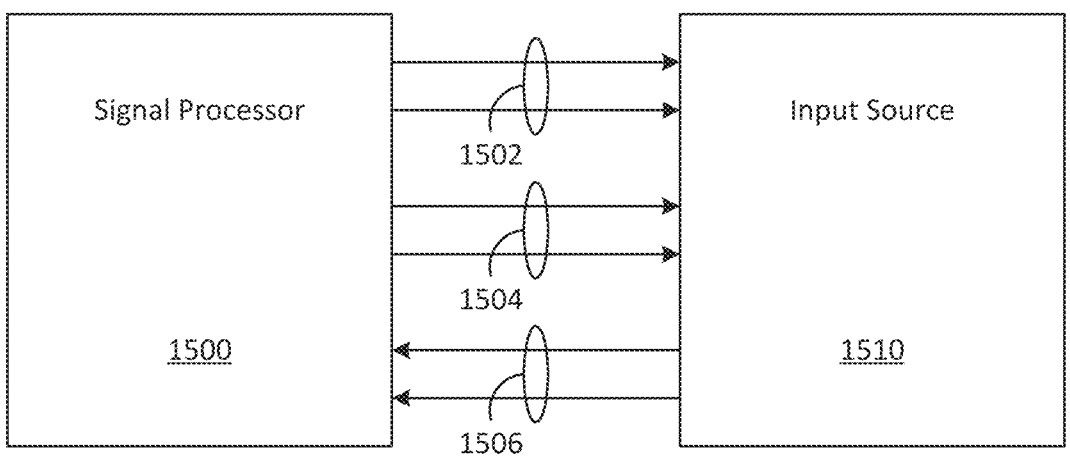
FIG. 15A is a high-level schematic diagram illustrating example communication configuration between a signal processor and an input source.

In the illustrated embodiment of FIG. 15A, the signal processor 1500 is in communication with the input source 1510. As described elsewhere herein, the input source 1510 can receive power from the signal processor 1500 via one or more power signals 1502. In some embodiments, the signal processor 1500 can provide power in the form of a signal and its inverse signal in order to maintain a charge balance. In some such examples, two wires/leads can be used to send the respective power signal and its inverse signal. In addition to the power signals, the signal processor 1500 can provide data signals 1504 to the input source which can carry data to control processing performed within the input source. In some embodiments, the data signals are sent via a data signal and its inverse signal to maintain charge balance. As shown and described previously with respect to FIG. 7B, the power signals 1502 and the data signals 1504 can be sent separately from one device to another. For example, in the embodiment of FIG. 15A, the data signals 1504 are sent separately from the power signals 1502. In some examples, such signals can be sent a different clocking rates such as described elsewhere herein. This can enable an increase in transfer efficiency of power and/or data from the signal processor 1500 to the input source 1510. Additionally, as discussed elsewhere herein, the input source 1510 can provide signals 1506, such as an input signal, to the signal processor 1500 for further processing.

Figure 15B:
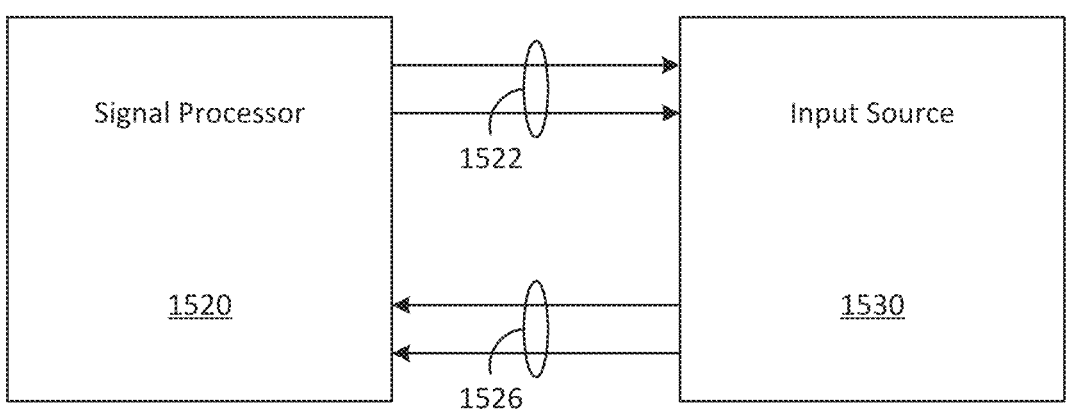
FIG. 15B is a high-level schematic diagram illustrating another example communication configuration between a signal processor and an input source.

While the signal processor can send power and data separately over different wires, in some embodiments, the signal processor can send power and data over the same wires. For example, in the embodiment of FIG. 15B, the signal processor 1520 is in communication with the input source 1530 with a single set of wires for sending power and data signals 1522 to the input source 1530. The signal processor 1520 can encode data into the power signals sent to the input source 1530 in a similar manner as shown and described with respect to FIG. 6B. As in FIG. 6B, the power signal with the encoded data signal can be sent to the input source via a data-encoded power signal and its inverse signal to maintain a charge balance in the wearer's body. Similar to the example in FIG. 15A, the input source 1530 can send data signals 1526, such as an input signal, to the signal processor 1520 for further processing.

Figure 15C:
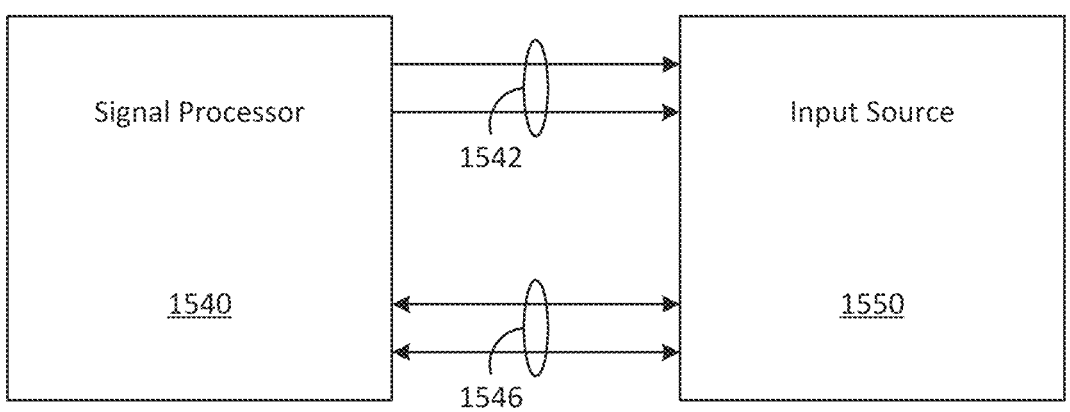
FIG. 15C is a high-level schematic diagram illustrating another example communication configuration between a signal processor and an input source.

The illustrated embodiment of FIG. 15C is an example alternative design for providing power and data to the input source from a signal processor. In the illustrated example, the signal processor 1540 is in communication with the input source 1550. As in FIG. 15A, power signals 1542 are sent to the input source 1550 via wires. Additionally, in the example of FIG. 15C, data can be communicated between the signal processor 1540 and input source 1550 via bidirectional communication 1546.

In an example embodiment, bidirectional communication 1546 can be used to provide an input signal from the input source 1550 to the signal processor 1540 and to send data from the signal processor 1540 to the input source 1550. For instance, in some embodiments, during operation, the input source 1550 can send an input signal to the signal processor which is representative of an acoustic stimulus as described elsewhere herein. However, in some embodiments, the signal processor 1540 can be configured to communicate data to the input source 1550 in certain circumstances, such as upon startup (e.g., a power cycle) of the input source 1550. In some such examples, upon startup or power cycling of the input source 1550, the signal processor 1540 can send data to control the input source's operation. Once the signal processor 1540 has communicated data to the input source 1550 via bidirectional communication 1546, the input source 1550 can send data (e.g., an input signal) to the signal processor 1540 via bidirectional communication 1546. If the input source 1550 is to receive data again in the future (e.g., for updating operation of the signal processor), the input source 1550 can be power cycled to initiate communication from the signal processor 1540 before resuming communication of, for example, an input signal, from the input source 1550 to the signal processor 1540.

Similarly, in some embodiments, the signal processor 1540 can be configured to communicate data to the input source 1550 upon startup (e.g., a power cycle) of the signal processor 1540. In some such examples, upon startup or power cycling of the signal processor 1540, the signal processor 1540 can send data to control the input source's operation. Once the signal processor 1540 has communicated data to the input source 1550 via bidirectional communication 1546, the input source 1550 can send data (e.g., an input signal) to the signal processor 1540 via bidirectional communication 1546. If the input source 1550 is to receive data again in the future (e.g., for updating operation of the signal processor), the signal processor 1540 can be power cycled to initiate communication from the signal processor 1540 before resuming communication of, for example, an input signal, from the input source 1550 to the signal processor 1540.

In any of embodiments 15A, 15B, and 15C, data received by the input source from the signal processor can be used to adjust one or more operations, such as analog processing, digital processing, and/or signal modification, that the input source performs. Moreover, such embodiments enable providing power to the input source to enable operation of powered components contained therein. The embodiments of FIGS. 15B and 15C allow for providing power and data to the input source as well as data from the input source to the signal processor fewer conductors than if all such signals were to be sent via individual conductors, such as via individual pairs of conductors to send signals and inverted signals to maintain charge balance.

In some embodiments, the signal processor is configured to send data tot eh input source in response to a received command, such as from an external device in communication with the implanted system. In some embodiments, such a command is communicated to the signal processor via wireless communication between the external device and an implantable battery and/or communication module, and then from the implantable battery and/or communication module to the signal processor, such as via communication techniques described herein. In such embodiments, an audiologist or other user can adjust operation of one or more adjustable components of the input source.

Various examples have been described. Some such examples are within the scope of the following claims.

The invention claimed is:
1. A cochlear implant system comprising:
an input source configured to receive a stimulus and generate an input signal representative of the stimulus;
a cochlear electrode;
a stimulator in communication with the cochlear electrode and configured to provide electrical stimulation to cochlear tissue via the cochlear electrode; and
a signal processor in communication with the stimulator and the input source, the signal processor being programmed with a first pulse rate and being configured to:
receive the input signal from the input source;
apply a filter to the received input signal to attenuate the first pulse rate in the received input signal; and
output a stimulation signal to the stimulator based on the filtered input signal, the stimulation signal causing the stimulator to provide electrical stimulation to the cochlear tissue at the first pulse rate.
2. The cochlear implant system of claim 1, wherein the first pulse rate is between 100 and 100,000 pulses per second.
3. The cochlear implant system of claim 1, wherein the cochlear electrode comprises a plurality of contact electrodes, and wherein the stimulator is configured to provide electrical stimulation via a plurality of stimulation channels corresponding to the plurality of contact electrodes.
4. The cochlear implant system of claim 3, wherein the first pulse rate includes pulse rates between 100 and 10,000 pulses per second per stimulation channel.
5. The cochlear implant system of claim 1, wherein applying the filter to the received input signal to attenuate the first pulse rate in the received input signal comprises attenuating a range of frequencies of the input signal, the range of frequencies including a frequency associated with the first pulse rate of the electrical stimulation.
6. The cochlear implant system of claim 5, wherein the filter comprises a band-stop filter which attenuates signals within the range of frequencies.
7. The cochlear implant system of claim 1, wherein the receiving the input signal from the input source comprises sampling the input signal via the signal processor to create a digital input signal, and wherein filtering the input signal comprises filtering the digital input signal.
8. The cochlear implant system of claim 1, wherein the filter is a digital filter.
9. The cochlear implant system of claim 1, wherein applying the filter to the received input signal to attenuate the first pulse rate in the received input signal comprises applying an analog filter to the input signal.
10. The cochlear implant system of claim 9, wherein the applying the analog filter to the input signal comprises tuning the analog filter to attenuate a frequency or range of frequencies corresponding to the first pulse rate.
11. The cochlear implant system of claim 1, wherein applying the filter to the received input signal further attenuates one or more harmonics of the first pulse rate.

* * * * *